(12) United States Patent
Wang et al.

(10) Patent No.: US 9,909,395 B2
(45) Date of Patent: Mar. 6, 2018

(54) WELLSITE HARDFACING WITH DISTRIBUTED HARD PHASE AND METHOD OF USING SAME

(71) Applicant: National Oilwell DHT, L.P., Houston, TX (US)

(72) Inventors: Ying Wang, The Woodlands, TX (US); Jiinjen Albert Sue, The Woodlands, TX (US)

(73) Assignee: NATIONAL OILWELL DHT, L.P., Houston, TX (US)

( * ) Notice: Subject to any disclaimer, the term of this patent is extended or adjusted under 35 U.S.C. 154(b) by 0 days.

(21) Appl. No.: 14/860,506

(22) Filed: Sep. 21, 2015

(65) Prior Publication Data
US 2017/0081944 A1 Mar. 23, 2017

(51) Int. Cl.
*E21B 41/00* (2006.01)
*B23K 10/02* (2006.01)
(Continued)

(52) U.S. Cl.
CPC .......... *E21B 41/00* (2013.01); *B23K 10/027* (2013.01); *B23K 26/0006* (2013.01); *B23K 26/34* (2013.01); *B23K 35/327* (2013.01); *C22C 19/07* (2013.01); *C22C 29/06* (2013.01); *C22C 38/005* (2013.01); *C22C 38/02* (2013.01); *C22C 38/04* (2013.01); *C22C 38/32* (2013.01);
(Continued)

(58) Field of Classification Search
USPC ........... 75/240; 428/325, 469, 472, 698, 699
See application file for complete search history.

(56) References Cited

U.S. PATENT DOCUMENTS

| 2,700,091 A | 1/1955 | Culbertson et al. |
| 2,806,129 A | 9/1957 | Cape |

(Continued)

FOREIGN PATENT DOCUMENTS

| CN | 1404956 | 3/2003 |
| CN | 1433868 | 8/2003 |

(Continued)

OTHER PUBLICATIONS

Postalloy Welding Products, "Hard Surfacing Build-Up Tool Steel Repair", Postle Industries, Inc., www.postle.com, 20 pages.
(Continued)

*Primary Examiner* — Archene Turner
(74) *Attorney, Agent, or Firm* — Conley Rose, P.C.

(57) ABSTRACT

A hardfacing disposable on a surface of a component, such as a wellsite component, is disclosed. The hardfacing comprises a surface portion and a bottom portion with a segregation line defined therebetween. The surface portion and the bottom portion each include a matrix phase including a matrix composition made of a metal alloy and a hard phase distributed in the matrix phase. The hard phase may include an abrasion-resistant composition made of a hard material (e.g., vanadium carbide). The surface portion has a first concentration of the abrasion-resistant composition and the bottom portion has a second concentration of the abrasion-resistant composition with the first concentration being greater than the second concentration such that a wear resistant surface is defined on the surface of the component.

26 Claims, 9 Drawing Sheets

(51) Int. Cl.

| | | |
|---|---|---|
| *B23K 26/34* | (2014.01) | |
| *B23K 26/00* | (2014.01) | |
| *C23C 4/129* | (2016.01) | |
| *C22C 38/40* | (2006.01) | |
| *C22C 38/02* | (2006.01) | |
| *C22C 38/04* | (2006.01) | |
| *C22C 38/44* | (2006.01) | |
| *C22C 38/50* | (2006.01) | |
| *C22C 38/48* | (2006.01) | |
| *C22C 38/32* | (2006.01) | |
| *C22C 38/00* | (2006.01) | |
| *C22C 19/07* | (2006.01) | |
| *B23K 35/32* | (2006.01) | |
| *C23C 4/06* | (2016.01) | |
| *C22C 29/06* | (2006.01) | |
| *E21B 10/46* | (2006.01) | |
| *B23K 103/04* | (2006.01) | |
| *B23K 103/16* | (2006.01) | |
| *B23K 103/00* | (2006.01) | |

(52) U.S. Cl.
CPC ............. *C22C 38/40* (2013.01); *C22C 38/44* (2013.01); *C22C 38/48* (2013.01); *C22C 38/50* (2013.01); *C23C 4/06* (2013.01); *C23C 4/129* (2016.01); *E21B 10/46* (2013.01); *B23K 2203/05* (2015.10); *B23K 2203/16* (2013.01); *B23K 2203/52* (2015.10)

(56) References Cited

U.S. PATENT DOCUMENTS

| | | | |
|---|---|---|---|
| 3,334,975 | A | 8/1967 | Quaas et al. |
| 3,999,036 | A | 12/1976 | Muratov et al. |
| 4,162,392 | A | 7/1979 | Brown et al. |
| 4,177,324 | A | 12/1979 | Brown et al. |
| 4,224,382 | A | 9/1980 | Brown et al. |
| 4,451,508 | A | 5/1984 | Brown |
| 4,813,495 | A | 3/1989 | Leach |
| 5,004,886 | A | 4/1991 | Born et al. |
| 5,667,903 | A | 9/1997 | Boyce |
| 6,103,997 | A | 8/2000 | Pan |
| 6,138,779 | A | 10/2000 | Boyce |
| 6,321,846 | B1 | 11/2001 | Rytlewski |
| 6,409,847 | B2 | 6/2002 | Kleemann |
| 6,861,612 | B2 | 3/2005 | Bolton et al. |
| 7,373,997 | B2 | 5/2008 | Kembaiyan et al. |
| 7,963,318 | B2 | 6/2011 | Wolpert et al. |
| 2002/0054972 | A1 | 5/2002 | Charpentier et al. |
| 2006/0185908 | A1 | 8/2006 | Kembaiyan et al. |
| 2009/0120692 | A1* | 5/2009 | Kembaiyan ............. E21B 10/54 175/425 |
| 2010/0101780 | A1 | 4/2010 | Ballew et al. |
| 2010/0236834 | A1 | 9/2010 | Xia et al. |
| 2010/0276209 | A1* | 11/2010 | Yong ...................... C22C 29/02 427/446 |
| 2011/0031028 | A1 | 2/2011 | Sreshta et al. |
| 2012/0018227 | A1 | 1/2012 | Puzz et al. |
| 2012/0067651 | A1 | 3/2012 | Xia et al. |
| 2013/0068449 | A1 | 3/2013 | Pillai et al. |
| 2013/0068741 | A1 | 3/2013 | Pillai et al. |
| 2013/0294962 | A1 | 11/2013 | Wallin et al. |
| 2014/0298728 | A1 | 10/2014 | Keshavan |

FOREIGN PATENT DOCUMENTS

| | | |
|---|---|---|
| CN | 1562550 | 1/2005 |
| CN | 2675322 | 2/2005 |
| CN | 101168221 | 4/2008 |
| CN | 101920413 | 12/2010 |
| CN | 102233491 | 11/2011 |
| EP | 2226129 A1 | 9/2010 |
| GB | 618429 | 2/1949 |
| GB | 956830 | 4/1964 |
| GB | 2357788 A | 7/2001 |
| GB | 2467439 A | 8/2010 |
| KR | 20040083407 | 10/2004 |
| RU | 2339496 | 11/2008 |
| WO | 9415745 | 7/1994 |
| WO | 2008/086083 A2 | 7/2008 |

OTHER PUBLICATIONS

S. H. Kang et al., "Thermal Fatigue Characteristics of PTA Hardfaced Steels", Surface Engineering, vol. 17, No. 6, 2001, pp. 498-504.

R. Liu et al., "An Improved Wear-resistant PTA Hardfacing: VWC/Stellite 21", Journal of Composite Materials, vol. 40, No. 24, 2006, pp. 2203-2215, 14 pages.

PCT/US2016/052646 International Search Report and Written Opinion dated Mar. 16, 2017 (17 p.).

\* cited by examiner

WELLSITE HARDFACING WITH DISTRIBUTED HARD PHASE AND METHOD OF USING SAME

BACKGROUND

This present disclosure relates generally to techniques for performing wellsite operations. More specifically, the present disclosure relates to wellsite equipment and hardfacing used in wellsite operations.

Oilfield operations may be performed to locate and gather valuable downhole fluids. Oil rigs are positioned at wellsites, and downhole equipment, such as drilling tools, are deployed into the ground by a drillstring to reach subsurface reservoirs. At the surface, the oil rig is provided with various surface equipment, such as a top drive, a Kelly and a rotating table, to deploy stands of drill pipe into the wellbore to form the drill string. A drill bit is mounted on the lower end of the drill string, and advanced into the earth to form a wellbore. The surface equipment may be used to apply torque to the stands of pipe and to rotate the drill bit.

The downhole equipment is exposed to harsh wellbore conditions during drilling that may cause wear and damage. Hardfacing has been provided to resist such wear. Examples of hardfacing are provided in US Patent/Application Nos. 2011/0031028, 2013068449 and 2013068741, the entire contents of which are hereby incorporated by reference herein.

SUMMARY

In at least one aspect, the present disclosure relates to a hardfacing disposable on a surface of a component. The hardfacing includes a surface portion and a bottom portion with a segregation line defined therebetween. The surface portion and the bottom portion each include a matrix phase comprising a matrix composition comprising a metal alloy and a hard phase distributed in the matrix phase. The hard phase comprises an abrasion-resistant composition comprising a hard material. The surface portion has a first concentration of the abrasion-resistant composition and the bottom portion has a second concentration of the abrasion-resistant composition with the first concentration being greater than the second concentration whereby a wear resistant surface is defined on the surface of the component.

The segregation line may be a line extending from a point half a vertical thickness of the hardfacing at a first location to another point half the vertical thickness of the hardfacing at a second location. The hardfacing may comprise about 5 to about 25 wt % of the abrasion-resistant composition and/or about 75 to about 95 wt % of the matrix composition. The first concentration may comprise ≥about 60 wt % of the abrasion-resistant composition and the second concentration may comprise ≤about 40 wt % of the abrasion-resistant composition. The abrasion-resistant composition may comprise particles having a particle size of about 40 to about 250 μm. The matrix composition may comprise an iron-based alloy, a cobalt-based alloy and/or stainless steel. The abrasion-resistant composition may comprise vanadium carbide, titanium carbide, and/or titanium boride. The abrasion-resistant composition may have a Vickers Hardness ≥about 2000, a density ≤about 15.0 g/cm3, and/or a coefficient of thermal expansion of about $5 \times 10^{-6}$ m/m/K to about $15 \times 10^{-6}$ m/m/K. The component may comprise a wellsite component and the surface may be steel.

In another aspect, the disclosure relates to a hardfacing disposable on a surface of a wellsite component. The surface comprises a metal alloy. The wellsite component is positionable at a wellsite about a wellbore. The hardfacing comprises a matrix phase comprising a matrix composition comprising a metal alloy, and a hard phase comprising an abrasion-resistant composition comprising vanadium carbide. The hard phase is distributed about the matrix phase whereby a wear resistant surface is defined on the surface of the wellsite component.

The abrasion-resistant composition may comprise ≥about 10 wt % vanadium carbide.

In yet another aspect, the disclosure relates to a method of hardfacing a surface of a component. The method involves defining a hardphasing material comprising a matrix phase and a hard phase by selecting a matrix composition for the matrix phase and selecting an abrasion resistant composition for the hard phase. The matrix composition comprises a metal alloy and is continuous. The abrasion resistant composition comprises a hard material and is discontinuous. The method further involves forming the hardfacing material by dispersing the hard phase within the matrix phase, and applying the hardfacing material over at least a portion of the surface of the component, the hardfacing material having a bottom portion adjacent the surface of the component and a surface portion on top of the bottom portion.

The selecting the matrix composition may comprise selecting from stainless steel, an iron-based alloy, or a cobalt based alloy. The selecting the abrasion-resistant composition may comprise selecting from the group consisting of vanadium carbide, titanium carbide, and titanium boride. The forming the hardfacing may comprise selectively dispersing the hard phase about the surface portion and the bottom portion of the hardfacing, selectively dispersing the hard phase about a surface portion and a bottom portion of the hardfacing such that a weight percent of hard phase decreases from a top surface to a bottom surface of the hardfacing, selectively dispersing the hard phase about a surface portion and a bottom portion of the hardfacing such that a weight percent of the hard phase in the surface portion is greater than the weight percent of the hard phase in the bottom portion, and/or selectively dispersing the hard phase about a surface portion and a bottom portion of the hardfacing such that the surface portion comprises ≥about 60 wt % of the abrasion-resistant composition and the bottom portion comprises ≤about 40 wt % of the abrasion-resistant composition.

The method may also involve defining a surface portion and a bottom portion of the hardfacing by defining a segregation line through the hardfacing. The segregation line may be defined by connecting a point half a vertical thickness of the hardfacing at a first location with another point half the vertical thickness of the hardfacing at a second location. The applying may be performed by welding, flame spray, plasma transferred arc (PTA), laser cladding process, and combinations thereof.

BRIEF DESCRIPTION OF THE DRAWINGS

So that the above recited features and advantages can be understood in detail, a more particular description, briefly summarized above, may be had by reference to the embodiments thereof that are illustrated in the appended drawings. It is to be noted, however, that the examples illustrated are not to be considered limiting of its scope. The figures are not necessarily to scale and certain features and certain views of the figures may be shown exaggerated in scale or in schematic in the interest of clarity and conciseness.

DETAILED DESCRIPTION

The description that follows includes exemplary apparatus, methods, techniques, and/or instruction sequences that embody techniques of the present subject matter. However, it is understood that the described embodiments may be practiced without these specific details.

The present disclosure relates to hardfacing (or hardbanding or overlaying or coating) of components, such as downhole tools, drill string tubulars, washpipes, mandrels, stabilizers, reamers, drill bits, and/or other wellsite components. The wellsite component(s) may be made of, for example, a metal (e.g., steel, stainless steel, and/or other Fe—Ni, Ni-based superalloy or Co-based superalloy). The hardfacing may be a hardfacing material clad to the wellsite components using, for example, welding (e.g., flame spray, plasma transferred arc (PTA), and/or laser cladding process).

The hardfacing (or hardfacing composition) may comprise a matrix (or continuous or binder) phase and a hard phase. The matrix phase may be made of a metal (e.g., stainless steel, cobalt, and/or other metal alloy), and the hard phase may be made of a hard material (e.g., vanadium carbide (VC), tungsten carbide (WC), titanium carbide (TiC), titanium diboride (TiB$_2$)) distributed at various locations throughout the matrix phase.

The hardfacing may be intended to provide various performance characteristics, such as a dense microstructure, a crack resistant surface, metallurgical bonding to substrates, and/or resistance to galling, abrasion, corrosion, and/or wear. The hardfacing may also be intended to provide the matrix phase and/or the hard phase with various other characteristics, such as smaller density of the hard phase, larger volume fraction of the same weight fraction of hard phase, higher volume carbide distribution at a surface portion of the hardfacing, a match of the thermal expansion coefficient (e.g., to stainless steel), a gradual decrease in thermal expansion coefficient (e.g., from a bottom to a top surface of the hardfacing), and/or increased hardness from conventional hardfacing.

Figure 1:
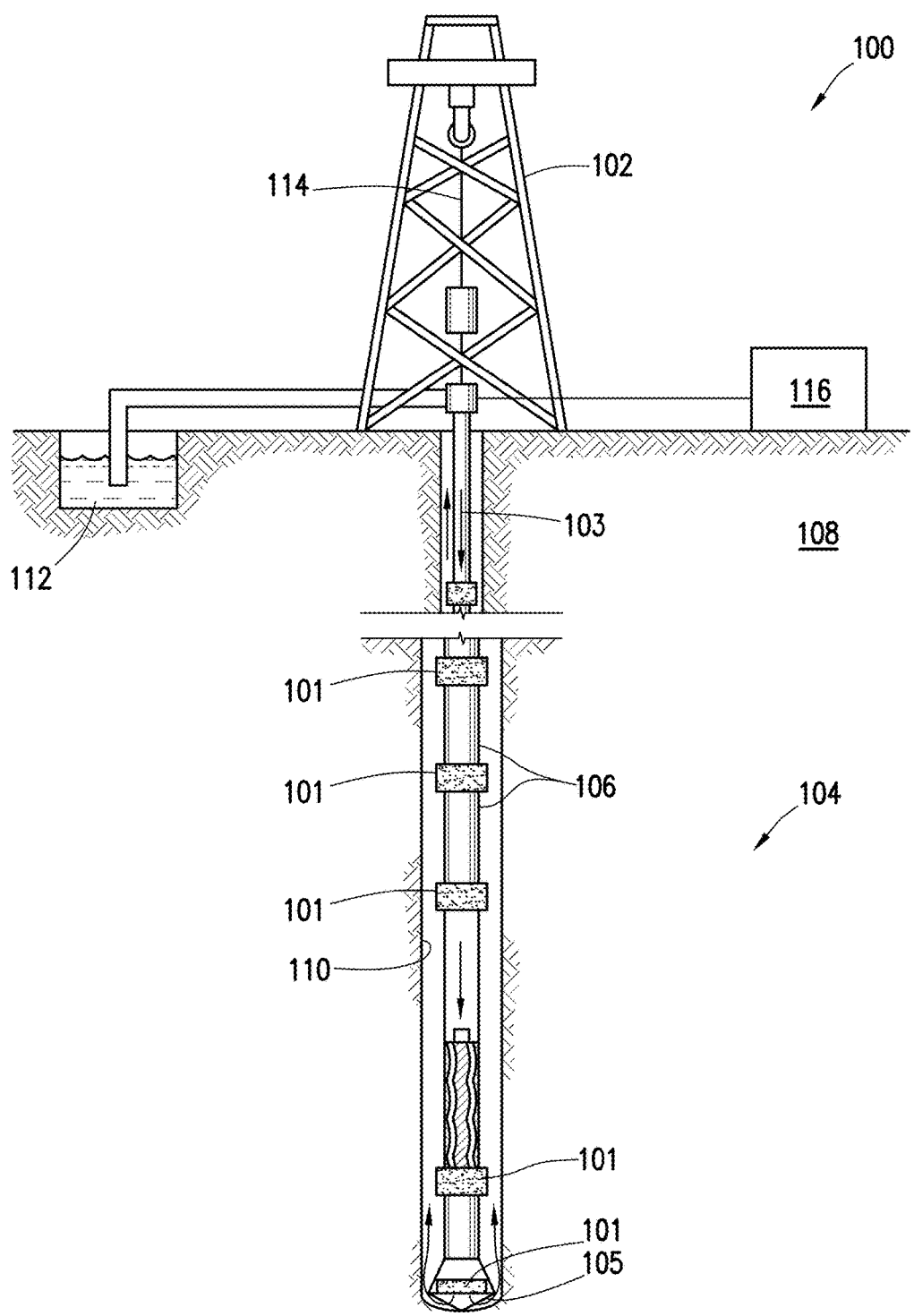
FIG. 1 is a schematic diagram, partially in cross-section of a downhole tool deployed into a wellbore, the downhole tool having hardfacing thereon.

FIG. 1 depicts an example environment in which hardfacing 101 may be employed. In the example of FIG. 1, the hardfacing 101 is used on various wellsite components at a wellsite 100. As shown, the wellsite 100 includes a rig 102 for performing various wellbore operations, such as drilling. The wellsite 100 as shown has wellsite equipment including a drill string 103 with a downhole tool (or bottom hole assembly (BHA)) 104 and a drill bit 105 at an end thereof. The drill bit 105 is advanced into a subterranean formation 108 via the drill string 103 to form a wellbore 110.

The drill string 103 may include tubulars (e.g., drill pipe, drill collars, coiled tubing heavy weight drill pipe, rotary substitutes, pup joints, tool joints, or other tubes) 106 deployable downhole to perform downhole operations. The tubulars 106 are connectable in series to form the drill string 103 for the passage of fluid therethrough. A mud pit 112 may be provided at the surface for passing mud through the drill string 103, the downhole tool 104, and out the bit 105 as indicated by the arrows.

Various surface (or rig) equipment 114, such as a Kelly, rotary table, top drive, elevator, etc., may be provided at the rig 102 to rotate the drill bit 105. A surface unit 116 is also provided at the surface to operate the wellsite equipment. The downhole tool 104, is deployed from the rig 102 and into the wellbore 110 by the drill string 103 to perform downhole operations.

The downhole tool 104 is at a lower end of the drill string 103 and contains various downhole equipment for performing downhole operations. Such equipment may include, for example, motors, measurement tools, electronics, etc. Such downhole equipment may be housed in drill collars or other tubulars.

While FIG. 1 depicts a land-based drilling rig with a specific configuration, the hardfacing 101 may be usable with a variety of land based, offshore, and/or other wellsite applications involving drilling or other operations. Also, while the hardfacing is depicted as being applied to an outer surface of the various wellsite equipment (e.g., the tubular 106, the downhole tool 104, and the drill bit 105), it will be appreciated that the hardfacing may be used on any portion (internal and/or external) of any component (wellsite and/or non-wellsite) having a surface (e.g., solid, machined, non-machined, and/or engineered surfacing) capable of receiving the hardfacing when applied thereto.

The hardfacing 101 as shown in FIG. 1 is applied to various downhole components, such as the drill bit 105 and the tubulars 106. The hardfacing 101 may be applied at any location to achieve desired performance and/or other characteristics. For example, hardfacing may be applied to outer surfaces of the downhole tool 104 that may engage the wall of the wellbore 110 and be subject to potential damage. Other examples may involve placement of the hardfacing on cutting tools (e.g., drill bits and knives), engine parts (e.g., valves, rockers, bearing journals), laboratory equipment (e.g., centrifuge sleeves), construction equipment, etc.

Figure 2:
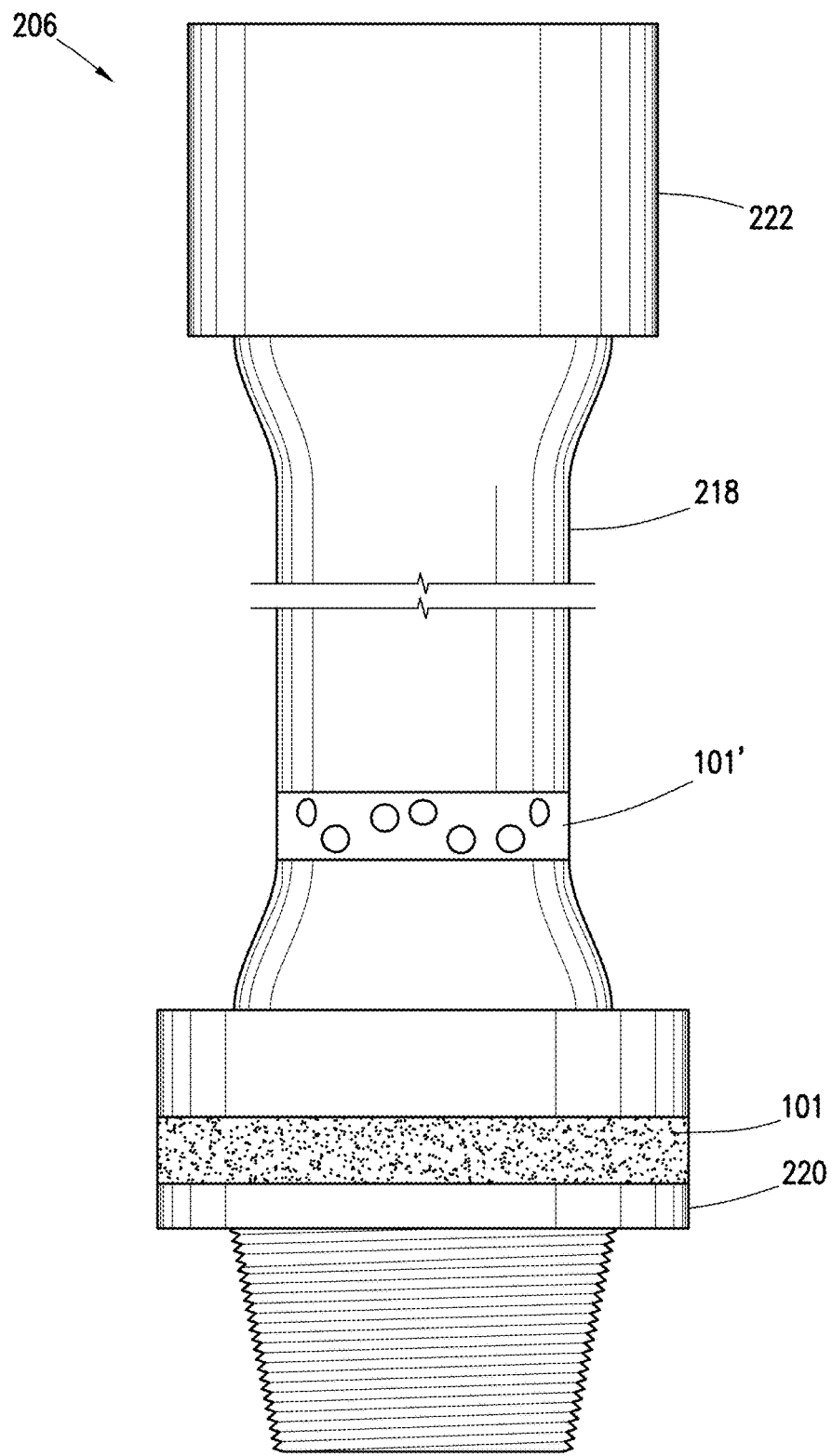
FIG. 2 is a schematic view of a wellsite component having various hardfacings thereon.

FIG. 2 depicts an example placement of the hardfacing 101, 101' about a wellsite component 206. As demonstrated by this figure, one or more hardfacings of various compositions, such as hardfacings 101,101', may be positioned about the component 206. For example, the hardfacing 101 may be any of the hardfacings provided herein and the hardfacing 101' may be a conventional hardfacing known to one of skill in the art (or vice versa). The component 206 as depicted is a drill pipe usable as the drill pipe 106 of the drill string 103 of FIG. 1. The drill pipe 106 is depicted as having a tubular body including a tubing portion 218, a pin 220, and a box 222.

While FIG. 2 depicts a specific example of a wellsite component 206 with certain configurations of hardfacings 101, 101' at certain locations along the wellsite component 206, various dimensions of one or more hardfacings of various shapes, sizes, compositions, locations, and/or other configurations may be disposed about the outer surface of one or more portions of the wellsite component 206 or other component. While not shown, such hardfacing 101 may be placed internal to the wellsite component 206, for example, in areas of high fluid flow, such as along internal fluid passages.

Figure 3:
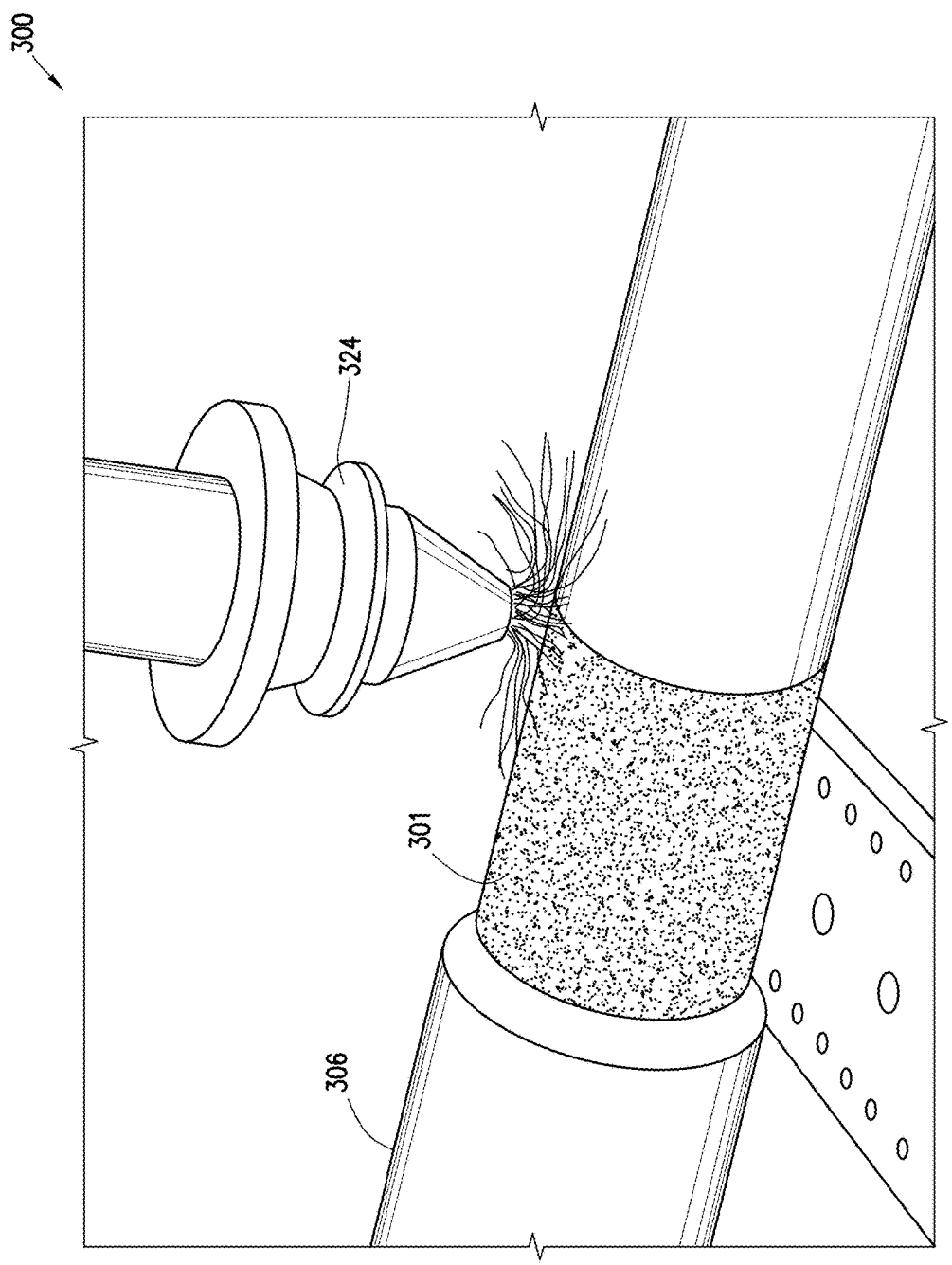
FIG. 3 is a schematic diagram depicting application of hardfacing.

FIG. 3 is a schematic diagram depicting an example process 300 for applying a hardfacing 301 (which may be representative of any hardfacing described herein) to a component 306 (which may be representative of the drill pipe/wellsite component 106/206 and/or any other component or substrate). The process 300 may be part of a manufacturing process for forming the component 306, or a separate process. The component 306 is depicted as an elongate member having a solid outer surface configured to receive the hardfacing 301 thereon.

The process 300 includes applying the hardfacing 301 with a welder 324. The welder 324 may be, for example, an open arc, PTA, welder, flame spray, plasma transferred arc (PTA), and/or laser cladding process capable of applying the hardfacing 301 onto the wellsite component 306. Examples of applying are described in U.S. Pat. No. 4,451,508; U.S. Pat. No. 4,162,392; U.S. Pat. No. 4,177,324; U.S. Pat. No. 4,224,382; "Thermal Fatigue Characteristics of PTA Hardfaced Steels", Surface Engineering, vol. 17, No. 6, (2001) p. 498; "An Improved Abrasion-resistant PTA Hardfacing: VWC/Stellite 21", *Journal of Composite Materials*, vol. 40, No. 24, (2006) p. 2203, each of which is hereby incorporated herein by reference in its entirety.

In an example involving welding, the heated hardfacing 301 may be melted onto the wellsite component 306 so that, when cooled, the hardfacing is affixed to the component. The hardfacing 301 of FIG. 3 is depicted as being applied in bands of various widths encircling portions of the wellsite component 306, but may be applied in any shape, depth, width, layers, and/or other geometry.

Figure 4:
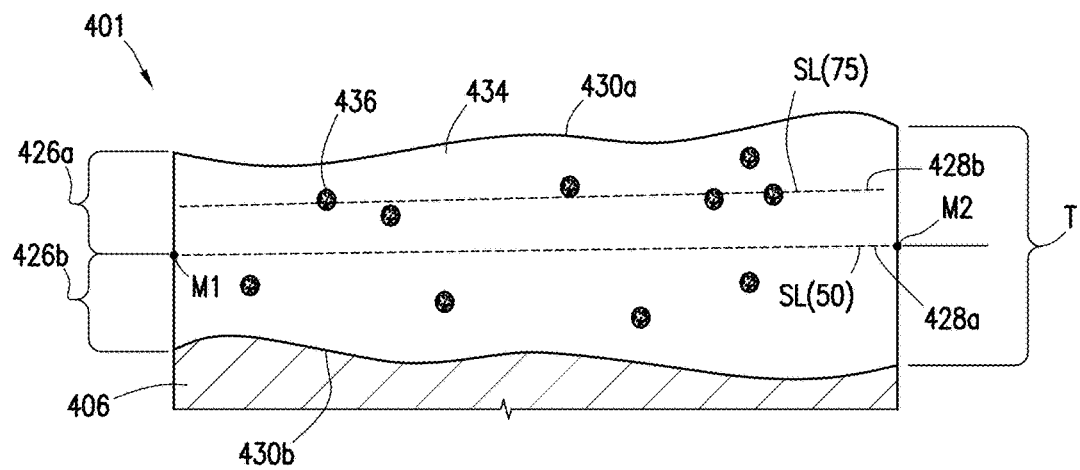
FIG. 4 is a schematic, cross-sectional view of a hardfacing applied to a component.
Figure 5:
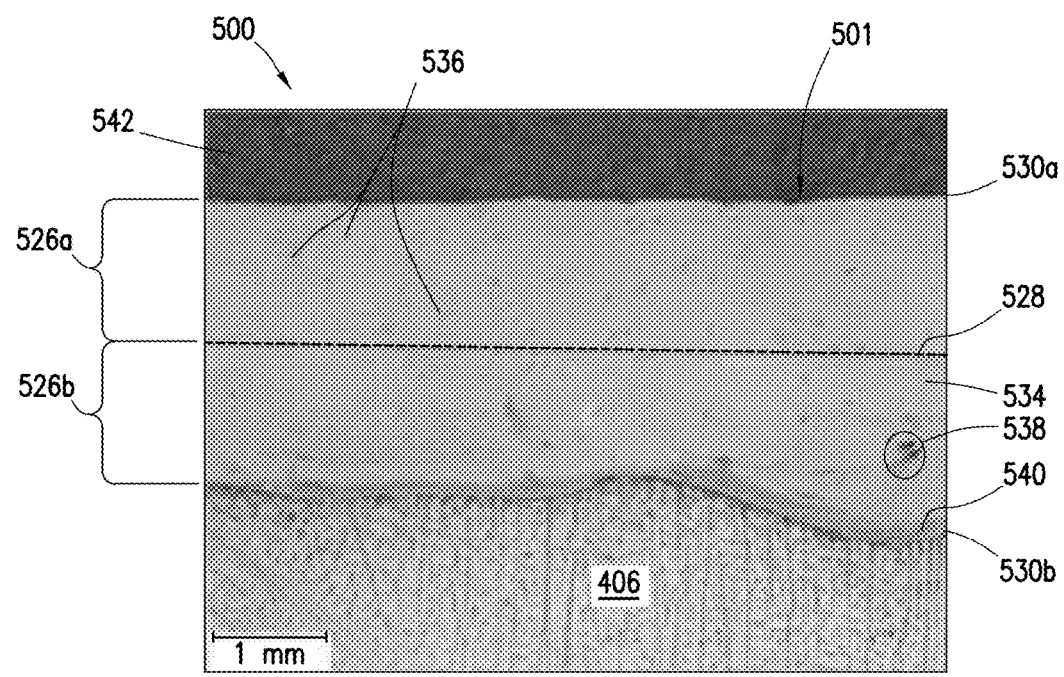
FIG. 5 is a micrograph of a cross-section of the hardfacing of Example 1.
Figure 6:
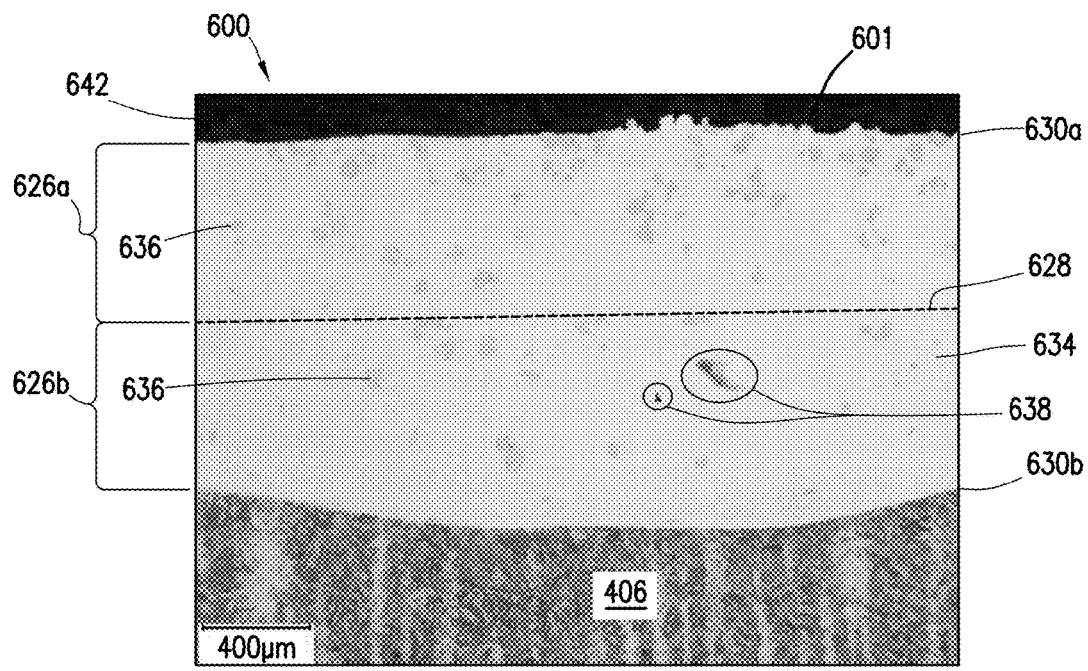
FIG. 6 is a micrograph of a cross-section of the hardfacing of Example 2.

FIG. 4 is a schematic diagram of a cross-sectional view of the hardfacing 401 (which may be representative of any hardfacing herein) as applied to a wellsite component 406 (which may be representative of any component herein). As shown in this example, the hardfacing 401 includes a surface portion 426a and a bottom portion 426b with a segregation line 428a defined therebetween. The surface portion 426a has a top surface 430a. The bottom portion 426b has a bottom surface 430b adjacent an outer surface of the component (or substrate) 406. The surfaces 430a,b may or may not be planar.

As also shown in FIG. 4, the hardfacing 401 comprises a matrix phase 434 and a hard (or discontinuity) phase 436 therein. The matrix phase 434 may form a base of the hardfacing 401 with the hard phase 436 formed as particles distributed therein. For example, the hardfacing 401 may be provided with the matrix phase 434 made of a metal (e.g., stainless steel, cobalt, and/or other metal alloy) and the hard phase 436 comprising a hard material (e.g., VC, WC, TiC, and/or TiB$_2$) distributed in the matrix phase 434.

The materials and placement may be modified to provide desired characteristics. For example, a concentration of the hard phase 436 may be selectively provided about portions of the hardfacing 401, such as the surface portion 426a and/or bottom portion 426b, to define desired characteristics. The hard phase 436 may be distributed in the matrix phase 434, for example, such that the quantity of particles of the hard phase 436 decreases from the top surface 430a to the bottom surface 430b, with most of the particles located between the segregation line 428a and the top surface 430a. In an example, the hardfacing 401 may be provided with a hard phase 436 having greater than about 10 wt % of VC distributed through the matrix phase 434 to provide a thermal expansion coefficient that decreases from the top surface 430a to the bottom surface 430b. Additional examples are provided herein.

Segregation

The position of the segregation line 428a between the surface and bottom portions 426a,b may be defined to achieve the desired characteristics. Some hardfacings may exhibit more segregation than other hardfacings thereby shifting the location of the segregation line. For example, as indicated by the notation SL(50), the segregation line 428a is at 50% of the thickness T of the hardfacing 401.

The segregation line 428a can be calculated to demark the surface portion 426a and the bottom portion 426b. For example, a segregation line demarking a surface portion comprising 50% of the total layer thickness (referred to herein as SL(50)) may be calculated by determining midpoints M1, M2 of the hardfacing thicknesses (e.g., from a photograph or micrograph, etc.) of a cross-section of the hardfacing. The midpoints M1, M2 may be determined by finding a distance halfway between the top surface 430a and the bottom surface 430b at locations along the hardfacing 401 (e.g., on each side of the micrograph, respectively). The segregation line 428a is formed at SL(50) by connecting the midpoints M1 and M2.

The surface portion 426a may be provided with various compositions above the segregation line (e.g., 428a,b). In other words, in particular embodiments ≥about 60 wt. %, e.g., ≥about 65 wt. %, ≥about 70 wt. %, ≥about 75 wt. %, ≥about 80 wt. %, ≥about 85 wt. %, ≥about 90 wt. %, ≥about 95.0 wt. %, of the abrasion-resistant composition is found in the surface portion 426a wherein the surface portion 426a represents the 50%, particularly 25%, more particularly 10%, of the cross-sectional thickness T furthest from the component 406. In another example, the surface portion 426a may comprise ≤about 99.0 wt %, e.g., ≤about 95.0 wt %, ≤about 90.0 wt %, ≤about 85.0 wt %, ≤about 80.0 wt %, ≤about 75.0 wt %, ≤about 70.0 wt %, or ≤about 65.0 wt %, of the abrasion-resistant composition. Ranges of the concentration of the abrasion-resistant composition in the surface portion 426a may include various combinations of the above-enumerated values, e.g. about 60.0 to about 99.0 wt %, 65 to about 95.0 wt %, about 70.0 to about 90.0 wt %, about 75.0 to about 85.0 wt %, about 80.0 wt %, etc.

The composition of the surface portion 426a may be different from the composition of the bottom portion 426b below the segregation line 428a. For example, the surface portion 426a may comprise ≥about 60 wt. %, e.g., ≥about 65 wt. %, ≥about 70 wt. %, ≥about 75 wt. %, ≥about 80 wt. %, ≥about 85 wt. %, ≥about 90 wt. %, ≥about 95.0 wt. %, of an abrasion-resistant composition in the hardfacing. In another example, surface portion 426a may comprise ≤about 99.0 wt %, e.g., ≤about 95.0 wt %, ≤about 90.0 wt %, ≤about 85.0 wt %, ≤about 80.0 wt %, ≤about 75.0 wt %, ≤about 70.0 wt %, or ≤about 65.0 wt %, of the abrasion-resistant composition. Ranges of the concentration of the abrasion-resistant composition in the surface portion 426a may include all combinations of any of the above-enumerated values, e.g. about 60.0 to about 99.0 wt %, 65 to about 95.0 wt %, about 70.0 to about 90.0 wt %, about 75.0 to about 85.0 wt %, about 80.0 wt %, etc.

In another example, a second segregation line 428b is also shown to demonstrate that the segregation lines 428a,b may be at various locations depending on the dimensions of the surface and bottom portions 426a,b. The segregation line 428b may be placed farther from the component 406, for example, to increase segregation of the hardfacing and to provide a higher concentration of the abrasion-resistant composition in the surface portion 426a. This segregation line 428b demarks a thickness of 75%, referred to herein as SL(75), of the total layer thickness T. The same procedure may be repeated for segregation lines at various locations about the hardfacing.

Distribution of the abrasion-resistant composition may be determined from evaluation of electron micrographs of representative hardfacing cross-sections. The number of abrasion-resistant regions above and below the segregation line may be counted. The sizes of the regions of particles may be uniform and may be determined or estimated from the micrograph. Particle size and size distribution of the abrasion-resistant composition may be determined, for example, using a MALVERN™ Particle Size Analyzer commercially available at www.malvern.com. The analyzer may be selected based on the anticipated or estimated range of particle sizes.

The percentage of the abrasion-resistant composition above the segregation line may be calculated by dividing the number of abrasion-resistant component particles above the segregation line by the total number of abrasion-resistant component particles in the micrograph. In an example, three or more micrographs, each containing at least 100 identifiable abrasion-resistant regions per hardfacing, may be used to obtain a representative analysis.

Matrix Composition

The matrix composition may be present in an amount ≥about 75 wt %, based on the total weight of the hardfacing. For example, some hardfacings comprise ≥about 77.5 wt %, ≥about 80.0 wt %, ≥about 82.5 wt %, ≥about 85.0 wt %, ≥about 87.5 wt %, ≥about 90.0 wt %, or ≥about 92.5 wt % of the matrix composition. Additionally or alternatively, the hardfacing may comprise ≤about 95 wt % of the matrix composition. For example, some compositions comprise ≤about 92.5 wt %, ≤about 90.0 wt %, ≤about 87.5 wt %, ≤about 85.0 wt %, ≤about 82.5 wt %, ≤about 80.0 wt %, or ≤about 77.5 wt of the matrix composition. Ranges for the amount of the matrix composition in the hardfacing may include ranges formed by combinations of the values disclosed herein. Exemplary ranges include e.g., about 75 to about 95 wt %, about 77.5 to about 92.5 wt %, about 80.0 to about 90.0 wt %, about 82.5 to about 87.5 wt %, about 85.0 wt % etc.

The matrix composition may be any material disposable on a component and supporting the hard phase therein. Iron-based alloys, i.e., alloys comprising ≥50.0 wt % iron, e.g. stainless steels (e.g., 420 stainless steel), and cobalt-based alloys, i.e., alloys comprising ≥50.0 wt % cobalt may be used. Exemplary iron-based alloys may include ≤about 95.0 wt % iron, e.g., ≤about 90.0 wt %, ≤about 87.5 wt %, ≤about 85.0 wt %, ≤about 80.0 wt %, ≤about 75.0 wt %, ≤about 65.0 wt %, or ≤about 60.0 wt % iron. Additionally or alternatively, the iron-based alloy may comprise iron in an amount of ≥60 wt %, e.g., ≥about 65.0 wt %, e.g., ≥about 75.0 wt %, ≥about 80.0 wt %, ≥about 85.0 wt %, ≥about 87.5 wt %, ≥about 90.0 wt %, or ≥about 92.5 wt % iron. Ranges of the iron content in the iron-based alloy may include combinations of any of the values herein, e.g., about 60.0 to about 95.0 wt % iron, or about 65.0 to about 92.5 wt %, or about 75.0 to about 90.0 wt %, or about 80.0 to about 87.5 wt %, about 85.0 wt % iron, etc.

Iron-based alloys may also include chromium and/or nickel. For example, some iron-based alloys comprise ≥about 7.5 wt % chromium, e.g., ≥about 10.0 wt %, ≥about 12.5 wt %, ≥about 15.0 wt %, or ≥about 17.5 wt % chromium. Additionally or alternatively, the iron-based alloy may comprise chromium in an amount of ≤about 20.0 wt %, e.g., ≤about 17.5 wt %, ≤about 15.0 wt %, ≤about 12.5 wt %, or ≤about 20.0 wt %. Ranges of the chromium content in the iron-based alloy that are expressly disclosed may include combinations of any of the above-enumerated values, e.g., about 7.5 to about 20.0 wt %, about 10.0 to about 17.5 wt %, about 12.5 to about 15.0 wt %, etc.

The amount of nickel may be ≥about 0.01 wt %, e.g., ≥about 0.05 wt %, ≥about 0.1 wt %, ≥about 1.0 wt %, ≥about 2.0 wt %, ≥about 5.0 wt %, or ≥about 7.5 wt. Additionally or alternatively, the amount of nickel in the iron-based alloy may be ≤about 10.0 wt %, e.g., ≤about 7.5 wt %, ≤about 5.0 wt %, ≤about 2.0 wt %, ≤about 1.0 wt %, ≤about 0.5 wt %, or ≤about 0.2 wt %. Ranges of the nickel content in the iron-based alloy may include combinations of the values herein, e.g., about 0.01 to about 10.0 wt %, about 0.05 to about 7.5 wt %, about 0.1 to about 5.0 wt %, about 1.0 to about 2.0 wt %, 0.05 to about 2.0 wt %, etc.

Carbon may be present in the iron-based alloy in an amount ≥0.05 wt %, e.g., ≥about 0.1 wt %, such as ≥about 0.2 wt %, ≥about 0.3 wt %, ≥about 0.4 wt %, ≥about 0.5 wt %, or ≥about 0.6 wt % carbon. Additionally or alternatively, carbon may be present in an amount ≤about 0.7% wt %, e.g., ≤about 0.6% wt %, ≤about 0.5% wt %, ≤about 0.4% wt %, ≤about 0.3% wt %, ≤about 0.2% wt %, or ≤about 0.1% wt % carbon. Ranges of the carbon content in the iron-based alloy may include combinations of the values herein, e.g., about 0.05 to about 0.7 wt % carbon, about 0.05 to about 0.6 wt %, about 0.05 to about 0.5 wt %, about 0.05 to about 0.4 wt %, about 0.05 to about 0.3 wt %, about 0.05 to about 0.2 wt %, or about 0.05 to about 0.1 wt %, or about 0.3 to about 0.5 wt % carbon, etc.

Silicon may be present in the iron-based alloy at a concentration of ≤about 2.5 wt % silicon, e.g., ≤about 2.0 wt %, ≤about 1.5 wt %, ≤about 1.0 wt %, ≤about 0.5 wt %, or ≤about 0.1 wt % silicon. Additionally or alternatively, the silicon concentration in the iron-based alloy may be ≥0 wt %, e.g., ≥about 0.1 wt %, e.g., ≥about 0.2 wt %, ≥about 0.3 wt %, ≥about 0.4 wt %, ≥about 0.5 wt %, ≥about 0.6 wt %, ≥about 0.75 wt %, ≥about 1.0 wt %, or ≥about 1.5 wt %, silicon. Ranges of the silicon content in the iron-based alloy may include combinations of the values herein, e.g., 0 to about 2.5 wt % silicon, about 0.1 to about 1.5 wt %, about 0.2 to about 1.0 wt %, about 0.3 to about 0.75 wt %, about 0.4 to about 0.6 wt %, silicon, etc.

Manganese may be present in the iron-based alloy, e.g., to serve as an oxygen and/or sulfur scavenger when the alloy is in the molten state. When such scavenging functionality is desired, manganese may be present at a concentration of ≤about 3.0 wt %, e.g., ≤about 2.5 wt %, ≤about 2.0 wt %, ≤about 1.5 wt %, ≤about 1.0 wt %, ≤about 0.5 wt %, ≤about 0.1 wt %, or about 0 wt % manganese. Ranges of the manganese content in the iron-based alloy may include combinations of the values herein, e.g., 0 to about 3.0 wt % manganese, 0 to about 2.5 wt %, 0 to about 2.0 wt %, about 1.0 to about 2.0 wt %, about 1.5 to about 2.5 wt % manganese, etc.

Tungsten and/or molybdenum may also be present in the iron-based alloy in an amount of 0.1 to about 10.0 wt %, e.g., 0.5 to 10.0 wt %, 1.0 to 5 wt %, particularly 0.5 to 10 wt % tungsten, 1 to 8 wt % tungsten, and/or 0.1 to 5.0 wt % molybdenum, 0.5 to 3 wt % molybdenum.

The iron-based alloy may include one or more of titanium, zirconium, and niobium. When used, the total concentration of these elements is generally ≥about 0.1 wt %, e.g., about 0.1 to about 1.8 wt %, or about 0.1 to about 1.5 wt %, or about 0.1 to about 1.0 wt %, or about 0.1 to about 0.6 wt %. For example, titanium and or zirconium may be present in an amount of about 0.1 to about 0.6 wt, and/or Niobium may be present in an amount of about 0.1-1.8%.

Cobalt may optionally be present at low levels, e.g., ≤about 1 wt %, e.g., about 0.1 to about 0.8, or about 0.3 to about 0.6 wt %

Boron may be present in the iron-based alloy, for example, to improve grain boundary performance. Boron may be present in an amount of, for example, from about 0 to about 0.1% wt %, e.g., 0 to 0.07 wt %, 0 to about 0.5 wt %, or 0.05 to about 0.1 wt %.

The iron-based alloy may also include one or more rare-earth elements, i.e., 15 elements of the lanthanide series ranging from lanthanum to lutetium in the Periodic Table, and yttrium and scandium, particularly cerium, lanthanum and neodymium, in an amount of about 0.005 to about 0.4 wt %. For example, the rare-earth elements may be incorporated into the present alloy (e.g., cerium, lanthanum and neodymium) and may form, in a combined amount, at least about 80% (e.g., at least about 90%,) of the total amount of the rare-earth elements.

Iron-based alloys may include aluminum, phosphorous, sulfur, and/or other elements, such as impurities inevitably incorporated into the composition during preparation when the material is prepared.

Cobalt-based alloys may also be suitable matrix compositions. Cobalt-based alloys may include ≤about 90.0 wt % cobalt, e.g., ≤about 80.0 wt %, ≤about 75.0 wt %, ≤about 70.0 wt %, ≤about 67.5 wt %, ≤about 65.0 wt %, ≤about 62.5 wt %, or ≤about 60.0 wt % cobalt. Additionally or alternatively, the cobalt-based alloy may comprise cobalt in an amount of ≥50 wt %, e.g., ≥about 55.0 wt %, ≥about 60.0 wt %, ≥about 62.5 wt %, ≥about 65.0 wt %, ≥about 67.5 wt %, ≥about 70.0 wt %, ≥about 75.0 wt %, ≥about 80.0 wt % cobalt. Ranges of the cobalt content in the cobalt-based alloy may include combinations of the values herein, e.g., about 50.0 to about 90.0 wt %, or about 55.0 to about 80.0 wt %, or about 60.0 to about 75.0 wt %, or about 62.5 to about 70.0 wt %, about 65.0 to about 67.5 wt % cobalt, etc.

Chromium may be present in the cobalt-based alloy in an amount ≥about 10 wt %, e.g., ≥about 20 wt %, ≥about 25.0 wt %, ≥about 27.5 wt %, ≥about 30.0 wt %, ≥about 32.0 wt %, ≥about 35.0, ≥about 37.5 wt %, or ≥about 40.0 wt % chromium. Additionally or alternatively, chromium may be present in an amount ≤about 45.0% wt %, e.g., ≤about 40.0% wt %, ≤about 37.5% wt %, ≤about 35.0% wt %, ≤about 30.0% wt %, ≤about 27.5% wt %, ≤about 25.0% wt %, or ≤about 20.0% wt % chromium. Ranges of the carbon content in the cobalt-based alloys may include combinations of the values herein, e.g., about 10 to about 45.0 wt % chromium, or about 20.0 to about 40.0 wt %, about 25.0 to about 37.5 wt %, about 27.5 to about 32.5 wt %, about 30.0 wt % chromium, etc.

Tungsten may be present in the cobalt-based alloy in an amount ≥about 1.0 wt %, e.g., ≥about 2.0 wt %, ≥about 3.0 wt %, ≥about 4.0 wt %, ≥about 5.0 wt %, ≥about 6.0 wt %, ≥about 7.0, ≥about 8.0 wt %, ≥about 9.0 wt % tungsten. Additionally or alternatively, tungsten may be present in an amount ≤about 10.0% wt %, e.g., ≤about 9.0% wt %, ≤about 8.0% wt %, ≤about 7.0% wt %, ≤about 6.0% wt %, ≤about 5.0% wt %, ≤about 4.0% wt %, ≤about 3.0% wt %, or ≤about 2.0% wt % tungsten. Ranges of the tungsten content in the cobalt-based alloy may include combinations of the values herein, e.g., about 1.0 to about 10.0 wt % tungsten, or about 2.0 to about 9.0 wt %, or about 3.0 to about 8.0 wt %, about 4.0 to about 7.0 wt %, about 3.0 to about 6.0 wt % tungsten, etc.

Carbon may be present in the cobalt-based alloy in an amount ≥0.05 wt %, e.g., ≥about 0.2 wt %, ≥about 0.4 wt %, ≥about 0.6 wt %, ≥about 0.8 wt %, ≥about 1.0 wt %, ≥about 1.2 wt %, ≥about 1.4 wt %, or ≥about 2.0 wt % carbon. Additionally or alternatively, carbon may be present in an amount ≤about 2.5% wt %, e.g., ≤about 2.0% wt %, ≤about 1.4% wt %, ≤about 1.2% wt %, ≤about 1.0% wt %, ≤about 0.8% wt %, ≤about 0.6% wt %, ≤about 0.4% wt %, or ≤about 0.2% wt % carbon. Ranges of the carbon content in the cobalt-based alloy may include combinations of the values herein, e.g., about 0.05 to about 2.5 wt % carbon, or about 0.2 to about 2.0 wt %, or about 0.4 to about 1.4 wt %, about 0.6 to about 1.4 wt %, about 0.8 to about 1.2 wt %, about 1.0 wt % carbon, etc.

Other elements, e.g., nickel, iron, silicon, manganese, and molybdenum may also be present in the cobalt-based alloys. Such other elements may be present in relatively small amounts. Exemplary cobalt-based alloys may include, for example, STELLITE™ alloys (e.g., STELLITE™ 6 alloy from KENNAMETAL™, Latrobe, Pa., see www.kennemetal.com). Other alloys may be useful as matrix composition, such as INCONEL® (e.g., INCONEL® 625, INCOLOY® alloys, BRIGHTRAY®, NIMONIC®, UDIMET®, UDIMAR®, NILO®, NILOMAG®, MONEL®, and Nickel/DURANICKEL® brand alloys commercially available from SPECIAL METALS™, Inc., Conroe, Tex. at www.specialmetals.com).

Combinations and permutations of any of the specified matrix compositions are expressly within the scope of the matrix materials described herein. For example, the matrix composition may comprise about 80 to about 90 wt %, e.g., about 85 wt % iron; about 0.05 to about 0.5 wt %, e.g. 0.1 wt % nickel; about 0.01 to about 0.08 wt %, e.g., about 0.04 wt %, cobalt; about 10 to about 15 wt %, e.g. about 13.5 wt %, chromium; about 0.002 to about 0.01 wt %, e.g., about 0.005 wt %, sulfur; about 0.008 to about 0.024 wt %, e.g., about 0.016 wt %, phosphorous; about 0.1 to about 0.5 wt %, e.g., about 0.3 wt %, manganese; about 0.22 to about 0.26 wt %, e.g., about 0.24 wt %, carbon; about 0.58 to about 0.64 wt %, e.g., about 0.61 wt %, silicon; and about 150 ppm of oxygen. Other suitable matrix compositions may include those disclosed in U.S. Pat. Nos. 6,409,847 and 7,963,318, which are incorporated by reference herein in their entireties.

Abrasion-Resistant Composition

The abrasion-resistant composition may be present in the hardfacing as a discrete or discontinuous phase within the matrix. The abrasion-resistant composition may be provided with a selected particle size and/or density. Abrasion-resistant compositions may also include various materials, such as transition metal borides, carbides, and nitrides. Hard material, such as transition metals, may include those of Periodic Table of The Elements Groups BIV-VI, such as vanadium carbides (e.g., VC, $V_8C_7$, $V_2C$, etc.), tungsten carbides (e.g., WC, $W_2C$), titanium carbides (e.g., TiC), titanium borides (e.g., $TiB_2$), and mixtures thereof may be used. Variations of these materials may be used, for example, WC may be in the form of WC and/or $W_2C$, and VC may be in the form of various forms of vanadium carbides (e.g., VC, $V_8C_7$, $V_2C$, etc.) with chemical names for each generically referred to by the format $W_xC_y$ or $V_xC_y$, particularly those where x≥y.

The hardfacing may comprise ≥about 5 wt % of the abrasion-resistant composition, based on the total weight of the hardfacing. For example, some hardfacings comprise ≥about 7.5 wt %, ≥about 10.0 wt %, ≥about 12.5 wt %, ≥about 15.0 wt %, ≥about 17.5 wt %, ≥about 20.0 wt %, or ≥about 22.5 wt % of the abrasion-resistant composition. Additionally or alternatively, the hardfacing may comprise ≤about 25 wt % of the abrasion-resistant composition. For example, some hardfacings may comprise ≤about 22.5 wt %, ≤about 20.0 wt %, ≤about 17.5 wt %, ≤about 15.0 wt %, ≤about 12.5 wt %, ≤about 10.0 wt %, or ≤about 7.5 wt % of the abrasion-resistant composition. Ranges for the amount of the abrasion-resistant composition in the hardfacing may include ranges formed by combinations of the values disclosed herein. Exemplary ranges may include e.g., about 5 to about 25 wt %, about 7.5 to about 22.5 wt %, about 10.0 to about 20.0 wt %, about 12.5 to about 17.5 wt %, about 15.0 wt % etc.

The abrasion-resistant composition may have a high hardness value (as indicated by the Vickers Hardness value) of ≥about 2000 HV, e.g., ≥about 2100 HV, ≥about 2200 HV, ≥about 2250 HV, ≥about 2300 HV, ≥about 2350 HV, ≥about 2400 HV, ≥about 2450 HV, ≥about 2500 HV, ≥about 2550 HV, ≥about 2600 HV, ≥about 2650 HV, ≥about 2700 HV, or ≥about 2750 HV. Additionally or alternatively, the abrasion-resistant composition may have a Vickers Hardness value of ≤about 2800 HV, ≤about 2750 HV, ≤about 2700 HV, ≤about 2650 HV, ≤about 2600 HV, ≤about 2550 HV, ≤about 2500 HV, ≤about 2450 HV, ≤about 2400 HV, ≤about 2350 HV, ≤about 2300 HV, ≤about 2250 HV, ≤about 2200 HV, ≤about 2100 HV. Ranges for the Vickers Hardness value of the abrasion-resistant composition may include ranges formed by combinations of the values disclosed herein. Exemplary ranges include e.g., about 2000 to about 2800, about 2100 to about 2750, about 2200 to about 2700, about 2300 to about 2650, about 2350 to about 2600, about 2400 to about 2550, about 2450 to about 2500, etc. Vickers Hardness value may be determined according to ASTM E384-11e1.

Density may play a role in the desirable segregation of the abrasion-resistant composition within the hardfacing. Some abrasion-resistant compositions have a density ≤about 15.0 $g/cm^3$, e.g., ≤about 12.0 $g/cm^3$, ≤about 10.0 $g/cm^3$, ≤about 8.0 $g/cm^3$, ≤about 7.0 $g/cm^3$, ≤about 6.0 $g/cm^3$, ≤about 5.0 $g/cm^3$, or ≤about 4.5 $g/cm^3$. Additionally or alternatively, the density may be ≥about 4.0 $g/cm^3$, ≥about 5.0 $g/cm^3$, ≥about 6.0 $g/cm^3$, ≥about 7.0 $g/cm^3$, ≥about 8.0 $g/cm^3$, ≥about 10.0 $g/cm^3$, or ≥about 12.0 $g/cm^3$. Ranges for the density of the abrasion-resistant composition may include ranges formed by combinations of the values disclosed herein. Exemplary ranges include e.g., about 3.5 to about 15.0 $g/cm^3$, about 4.0 to about 12.0 $g/cm^3$, 4.0 to about 6.0 $g/cm^3$, about 5.0 to about 10.0 $g/cm^3$, 6.0 to about 8.0 $g/cm^3$, or about 7.0 $g/cm^3$. The density of the abrasion-resistant composition may be less than the density of the matrix composition.

The abrasion-resistant composition may also have a certain particle size and/or shape. For example, the abrasion-resistant composition may be irregular, spherical (sometimes referred to as spheroidal), cylindrical, plate-like, and/or mixtures thereof. In another example, the particle size may be ≥about 40 μm, e.g., ≥about 60 μm, ≥about 80 μm, ≥about 100 μm, ≥about 120 μm, ≥about 140 μm, ≥about 150 μm, ≥about 160 μm, ≥about 170 μm, ≥about 180 μm, ≥about 190 μm, ≥about 200 μm, or ≥about 225 μm. Additionally or alternatively, the wear-resistance composition may have a particle size of ≤about 250 μm, e.g., ≤about 225 μm, ≤about 200 μm, ≤about 190 μm, ≤about 180 μm, ≤about 170 μm, ≤about 160 μm, ≤about 150 μm, ≤about 140 μm, ≤about 120 μm, ≤about 100 μm, ≤about 80 μm, ≤about 60 μm. Ranges for the particle size of the abrasion-resistant composition may include ranges formed by combinations of the values disclosed herein. Exemplary ranges may include e.g., about 40 to about 250 μm, about 60 to about 200 μm, about 60 to about 190 μm, about 60 to about 160 μm, about 80 to about 190 μm, 100 to about 180 μm, about 120 to about 170 μm, 140 to about 160 μm, about 150 μm, etc. Particle size may be determined prior to hardfacing formation and may be determined in a properly calibrated particle size analyzer. Particle sizes referred to herein refer to a geometric mean of the particle size distribution.

The abrasion-resistant composition may also be characterized by a different particle size distribution referred to as $D(x)$, where x is the percentage of particles in the sample having a size greater than the minimum. For example a sample having a $D(75)=90.5$ μm means that at least 75 wt % of the particles in the sample have a size of at least 90.5 μm. Likewise a $D(90)=90.5$ means that at least 90 wt % of the particles in the sample have a size of at least 90.5 μm. Some abrasion-resistant compositions useful herein have a $D(75)$ ≥about 60 μm, e.g., ≥about 80 μm, ≥about 90 μm, ≥about 100 μm, ≥about 120 μm, ≥about 140 μm, ≥about 160 μm, ≥about 180 μm. Additionally or alternatively, the $D(75)$ value of some abrasion-resistant compositions may be ≤about 200 μm, e.g., ≤about 180 μm, ≤about 160 μm, ≤about 140 μm, ≤about 120 μm, ≤about 100 μm, ≤about 90 μm, ≤about 80 μm. Ranges for the $D(75)$ particle size of the abrasion-resistant composition may include ranges formed by combinations of the values disclosed herein. Exemplary ranges may include, e.g., about 60 to about 200 μm, about 80 to about 180 μm, about 90 to about 160 μm, about 100 to about 140 μm, about 120 μm, etc. Some abrasion-resistant compositions may additionally or alternatively be characterized by a $D(90)$ ≥about 60 μm, e.g., ≥about 80 μm, ≥about 90 μm, ≥about 100 μm, ≥about 120 μm, ≥about 140 μm, ≥about 160 μm, ≥about 180 μm. Additionally or alternatively, the $D(90)$ value of some abrasion-resistant compositions may be ≤about 200 μm, e.g., ≤about 180 μm, ≤about 160 μm, ≤about 140 μm, ≤about 120 μm, ≤about 100 μm, ≤about 90 μm, ≤about 80 μm. Ranges for the $D(90)$ particle size of the abrasion-resistant composition may include ranges formed by combinations of the values disclosed herein. Exemplary ranges include, e.g., about 60 to about 200 μm, about 80 to about 180 μm, about 90 to about 160 μm, about 100 to about 140 μm, about 120 μm, etc. Particle size distribution may be measured according to ASTM D6913-04(2009)e1.

The abrasion-resistant compositions may have a coefficient of thermal expansion of ≥about $5 \times 10^{-6}$ m/m/K, e.g., ≥about $7 \times 10^{-6}$ m/m/K, ≥about $9 \times 10^{-6}$ m/m/K, ≥about $11 \times 10^{-6}$ m/m/K, or ≥about $13 \times 10^{-6}$ m/m/K. Additionally or alternatively, coefficient of thermal expansion may be ≤about $15 \times 10^{-6}$ m/m/K, e.g., ≤about $13 \times 10^{-6}$ m/m/K, ≤about $11 \times 10^{-6}$ m/m/K, ≤about $9 \times 10^{-6}$ m/m/K, or ≤about $7 \times 10^{-6}$ m/m/K. Ranges for the coefficient of thermal expansion of the abrasion-resistant composition may include ranges formed by combinations of the values disclosed herein. Exemplary ranges include, e.g., about $5 \times 10^{-6}$ to about $15 \times 10^{-6}$ m/m/K, $7 \times 10^{-6}$ to about $13 \times 10^{-6}$ m/m/K, $9 \times 10^{-6}$ to about $11 \times 10^{-6}$ m/m/K, etc. Coefficient of thermal expansion may be determined according to ASTM D5335-14.

EXAMPLES

Examples 1-13 are provided to demonstrate various characteristics of the hardfacing when used with various compositions. Examples 1-11 provide performance characteristics, namely volume loss, for given compositions. Table 1 below provides a summary of the data generated in Examples 1-11 to indicate abrasion resistance of the hardfacing using various compositions:

TABLE 1

RESULTS SUMMARY

| EXAMPLE NO. | ABRASION-RESISTANT COMPOSITION | PARTICLE SIZE (μm) | STAINLESS STEEL WT % | ABRASION-RESISTANT COMPOSITION WT % | VOLUME LOSS (MM³/1000 REVS) |
|---|---|---|---|---|---|
| 1 | VC (Sintered) | 63-160 | 85 | 15 | 3.7 |
| 2 | VC (Sintered) | 45-90 | 90 | 10 | 8.3 |
| 3 | VC (Spherical) | 45-150 | 85 | 15 | 20.6 |
| 4 | WC (Spherical) | 74-210 | 90 | 10 | 10.6 |
| 5 | Stainless Steel without a Hard Phase Material | N/A | 100 | 0 | 41.8 |
| 6 | VC (Sintered) | 63-160 | 95 | 5 | 21.6 |
| 7 | VC (Sintered) | 63-160 | 90 | 10 | 7.7 |
| 8 | VC (Sintered) | 45-90 | 95 | 5 | 23.6 |
| 9 | WC (spherical) | 74-105 | 90 | 10 | 19.9 |
| 10 | WC (spherical) | 160-250 | 90 | 10 | 15.1 |
| 11 | Chrome plating | N/A | N/A | N/A | 8.0 |

Certain examples in Table 1 are used as references. For example, Example 5 is a matrix phase made of stainless steel without a hard phase. In another example, Example 11 refers to chrome plating in place of hardfacing. In at least some Examples, volume loss that is greater than the volume loss achieved using chrome plating is considered acceptable.

Examples 1-4 are also shown in micrographs 500-900 of FIGS. 5-9. (Examples 6-10, not shown in micrographs, have different particle sizes and/or weight percentages, resulting in different volume losses.) Each micrograph 500-800 illustrates representative cross-sections of the hardfacings 501-801 applied to the component 406. Similar to the structure depicted in the hardfacing 401 of FIG. 4, the hardfacings 501-801 of FIGS. 5-8 each include the surface portion 526a-826a and the bottom portion 526b-826b with the segregation line 528-828 therebetween. In each case, the segregation line 528-828 is at a depth of 50% of the thickness, namely at SL(50). The surface portions 526a-826a extend from the top surface 530a-830a to the segregation line 528-828 and the bottom portions 526b-826b extend from the segregation line 528-828 to the bottom surface 530b-830b. The hardfacing 501-801 comprises the matrix phase 534-834 with hard phase 536-836 therein.

Example 1

A hardfacing 501 comprising 85 wt % 420 stainless steel and 15 wt % sintered vanadium carbide (VC) having a particle size of 63-160 μm is mixed and applied to a component by laser cladding. As shown in the micrograph 500 of FIG. 5, the hard phase 536 comprises a vanadium carbide abrasion-resistant composition and appears as a slightly darker, discrete region within the matrix phase 534. The matrix phase 534 is a stainless steel phase appearing as the lighter gray continuous region dispersed through the surface and bottom portions 526a,b. The dark layer 540 just above the bottom surface 530b is a remnant of the polishing process used to prepare the sample and is, therefore, excluded in determining the amount of the abrasion-resistant phase in the surface and bottom portions 526a,b. An impurity region 538 and the sample background region 542 are also shown and excluded.

The vanadium carbide content of the surface portion 526a represents about 60.2% to about 67.7% of the vanadium carbide in the hardfacing. Wear-resistance testing shows a volume Loss of 3.7 mm³/1000 revolutions.

Example 2

Example 1 is substantially repeated except that the hardfacing 601 comprises 90 wt % 420 stainless steel and 10 wt % sintered vanadium carbide having a particle size of 45-90 μm. As shown in the micrograph 600 of FIG. 6, the hard phase 636 comprises a vanadium carbide abrasion-resistant composition and appears as a slightly darker, discrete region within the matrix phase 634. The matrix phase 634 is a stainless steel phase appearing as the lighter gray continuous region dispersed through the surface and bottom portions 626a,b. An impurity region 638 and the sample background region 642 are excluded from the analysis.

The vanadium carbide content of the surface portion 626a represents about 60.2% to about 71.0% to about 75.6% of the vanadium carbide in the hardfacing. Wear-resistance testing shows a volume loss of 8.3 mm³/1000 revolutions.

Example 3

Figure 9:
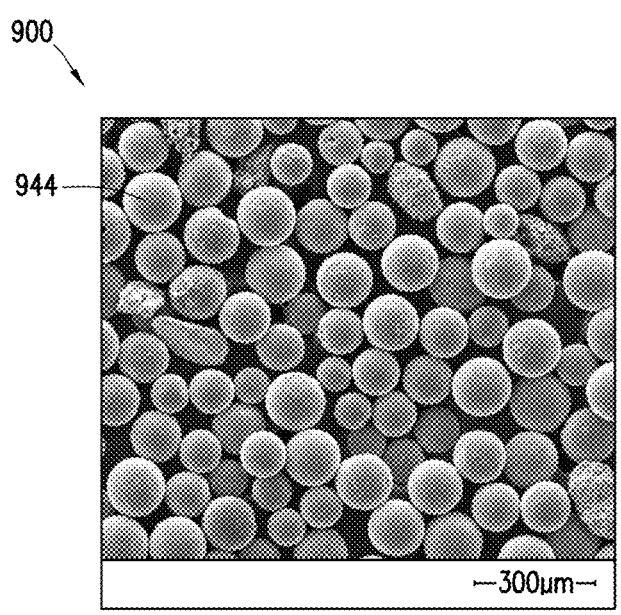
FIG. 9 is a micrograph of spherical vanadium carbide (VC) particles.

In Example 3, Example 1 is substantially repeated except that the hardfacing 701 comprises 85 wt % 420 stainless steel and 15 wt % spherical vanadium carbide having a particle size of 45-150 μm. FIG. 9 is a micrograph 900 depicting spherical particles 944.

Figure 7:
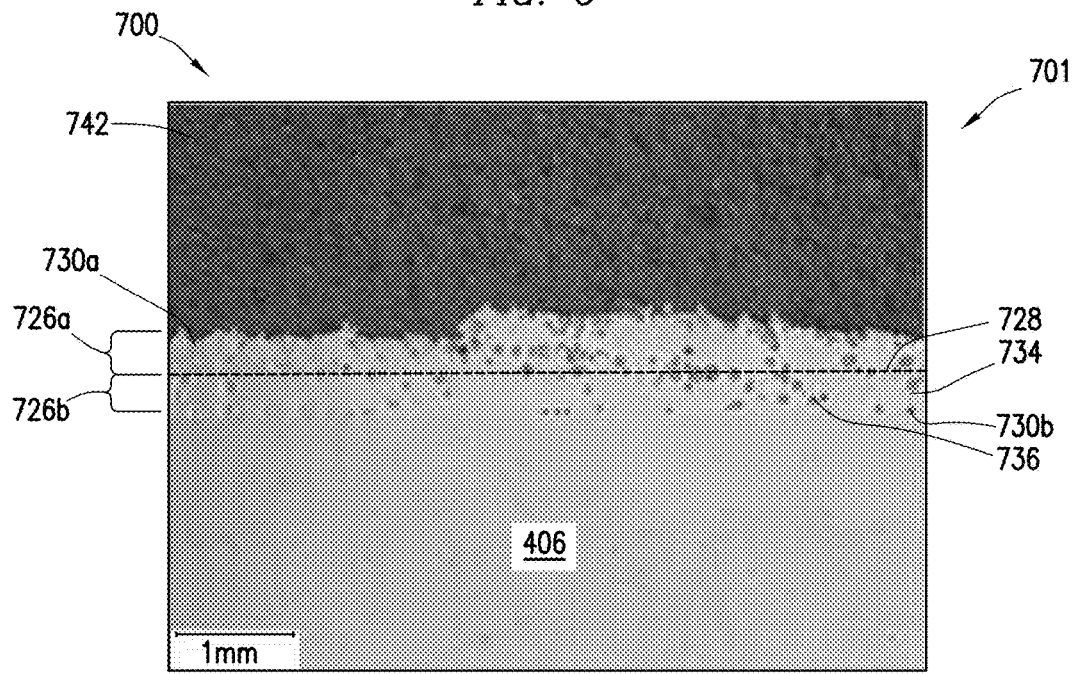
FIG. 7 is a micrograph of a cross-section of the hardfacing of Example 3.
Figure 8:
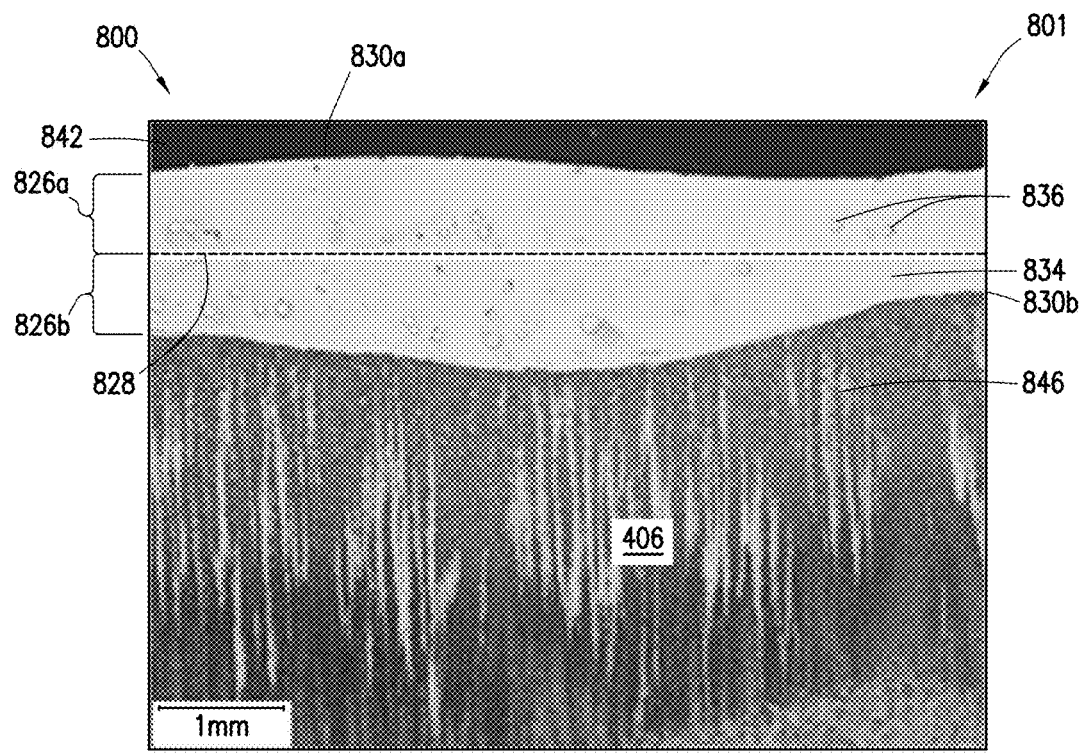
FIG. 8 is a micrograph of a cross-section of the hardfacing of Example 4.

As shown in the micrograph 700 of FIG. 7, the hard phase 736 comprises a vanadium carbide abrasion-resistant composition and appears as a slightly darker, discrete region within the matrix phase 734. The matrix phase 734 is a stainless steel phase appearing as the lighter gray continuous region dispersed through the surface and bottom portions 726a,b. The sample background is shown at region 742, which is excluded.

The vanadium carbide content of the surface portion 726a represents about 66.7% of the vanadium carbide in the hardfacing. Wear-resistance testing shows a volume loss of 20.6 mm³/1000 revolutions.

Example 4 (Comparative)

In Example 4, Example 1 is substantially reproduced except that the hardfacing 801 comprises 90 wt % 420 stainless steel and 10 wt % tungsten carbide (WC) having a particle size of 74-210 μm. As shown in the micrograph 800 of FIG. 8, component 406 shows light colored striations 846, believed to be related to prior thermal or physical stress applied to the component 406. The hard phase 836 comprises WC which appears as discrete regions having a dark outline positioned within the matrix phase 834. The matrix phase 834 is a stainless steel phase appearing as the lighter gray continuous region dispersed through the surface and bottom portions 826a,b. The sample background is shown at region 842, which is excluded.

The WC content of the surface portion 826a represents about 38.9% of the WC in the hardfacing. Wear-resistance testing shows a volume loss of 10.6 mm³/1000 revolution.

EXAMPLES—CRACKING

Examples 12-13

Examples 12-13 provide additional performance characteristics, namely cracking, for given compositions. For these examples, the content of VC has been selected to demonstrate potential effects of VC content on crack resistance. These examples are shown in micrographs 1000a,b in FIGS. 10A-10B. These micrographs show a top surface 1030a,b of the hardfacing 1001a,b.

Figure 10A:
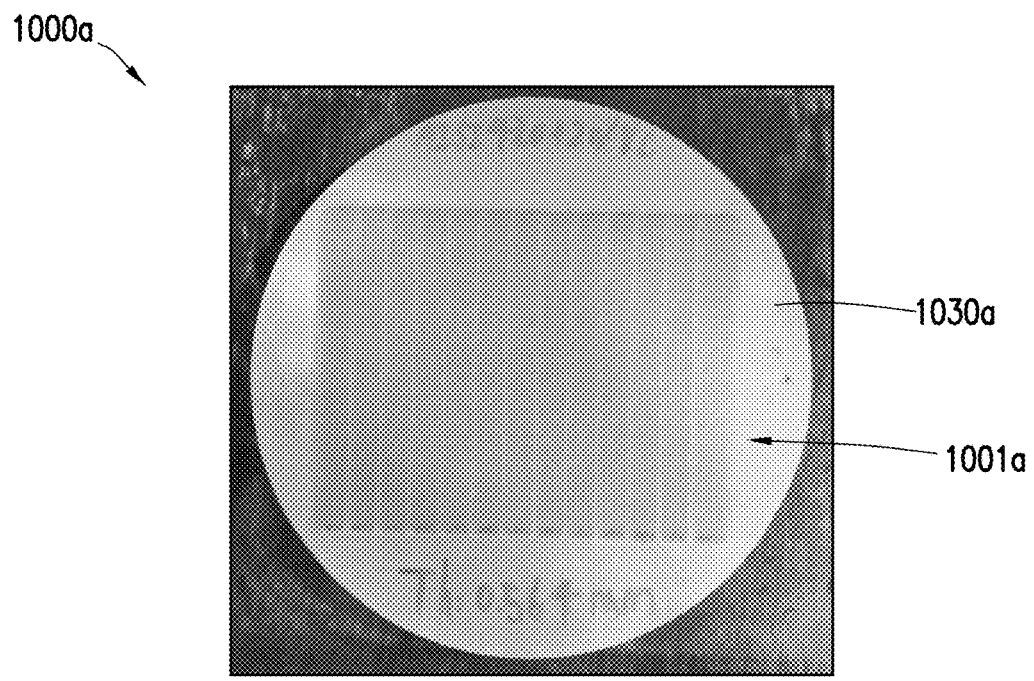
FIG. 10A is a micrograph of a top surface of the hardfacing of Example 12.
Figure 10B:
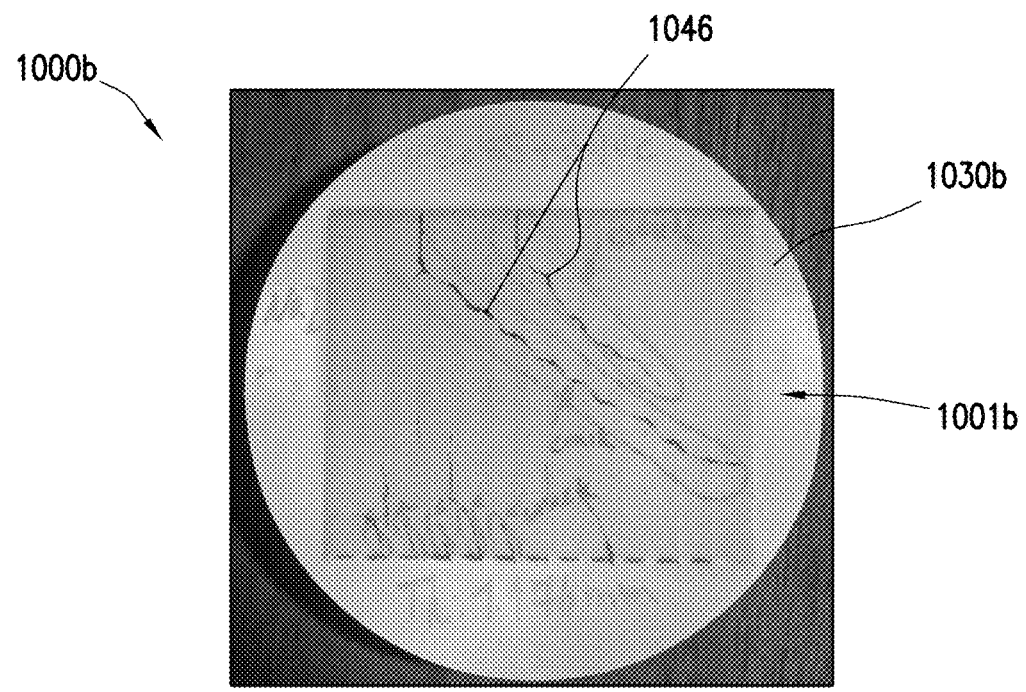
FIG. 10B is a micrograph of the top surface of the hardfacing of Example 13.

These examples were prepared with a higher vanadium carbide content. In Example 12, Example 1 is substantially reproduced, except that the hardfacing comprises 80 wt % 420 stainless steel and 20 wt % vanadium carbide. FIG. 10A shows that the resulting hardfacing 1001a has acceptable crack resistance (e.g., no crack detected).

Example 13 is prepared in substantially the same manner except that the hardfacing 1001b comprises 70 wt % 420 stainless steel and 30 wt % vanadium carbide. This figure demonstrates that this hardfacing 1001b has a lower crack resistance as evidenced by the cracks 1046 along the top surface 1030b.

Material Selection

As indicated by the examples above, various configuration (e.g., compositions and/or concentrations) of the composition of the hardfacing may affect performance characteristics. The differences in performance of the various compositions may be due to physical properties and/or interaction of the materials selected. Table 2 illustrates differences in physical properties for selected materials as shown below:

TABLE 2

PHYSICAL PROPERTIES OF EXAMPLE MATERIALS.

| PROPERTY | Fe-ALLOYS 4140, 4145 (Component) | 420 STAINLESS STEEL (Matrix Phase) | TUNGSTEN CARBIDE (WC) (Hard Phase) | VANADIUM CARBIDE (VC) (Hard Phase) |
|---|---|---|---|---|
| Density, g/cm³ | 7.85 | 7.85 | 16.8 | 5.77 |
| Melting Temp, °C. | 1534 | 1480-1530 | 2735 | 2810 |
| Hardness, HV | 400 | 500 | 2300 | 2660 |
| Thermal Expansion Coefficient, 10⁻⁶ m/m/K | 13.5 | 10.3 | 4.5 | 7.45 |

Table 2 above shows example materials usable for the component (e.g., Fe alloys), the matrix phase (e.g., 420 stainless steel), and the hard phase (e.g., WC or VC).

Figure 11:
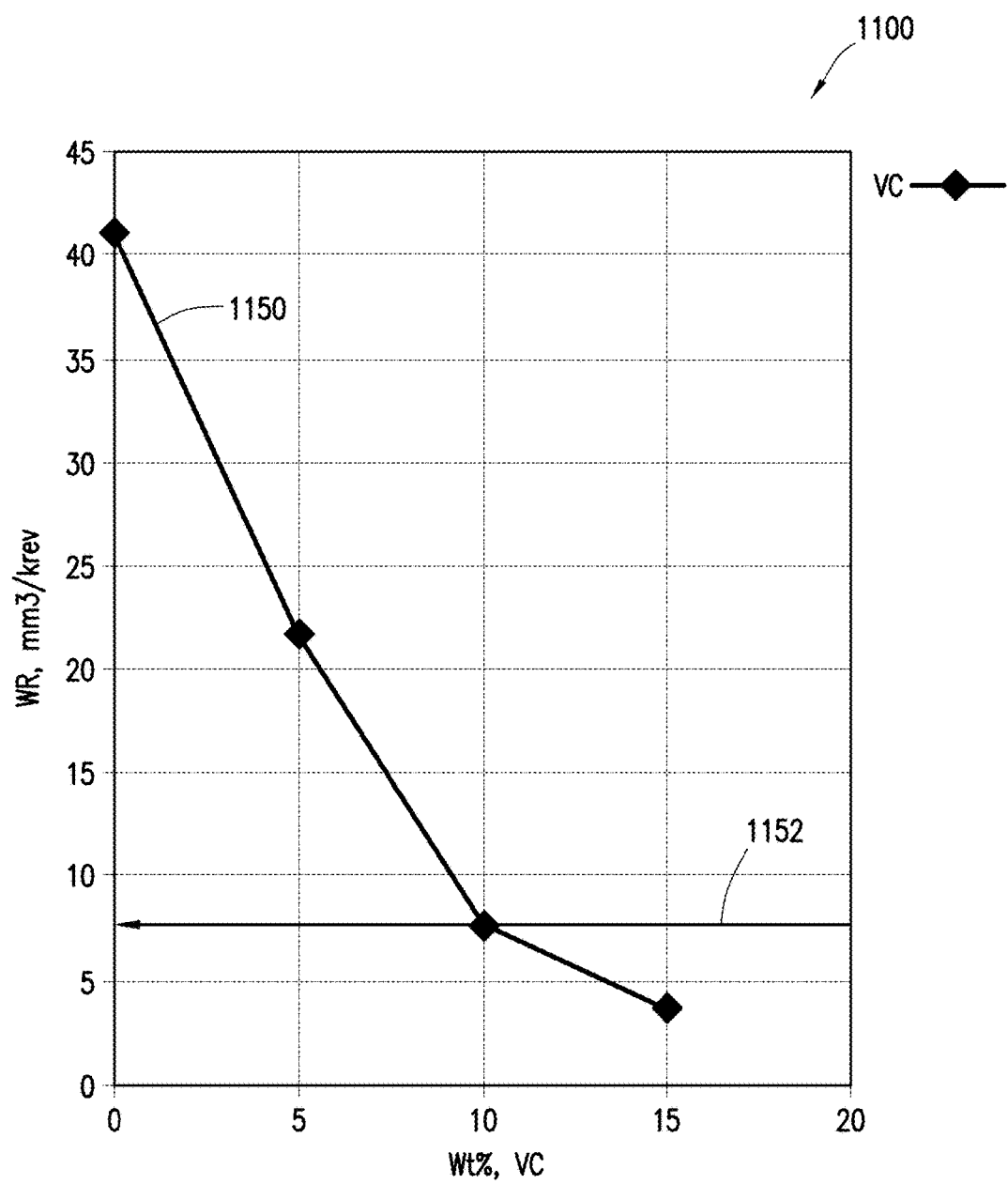
FIG. 11 is a graph illustrating wear resistance versus VC content.

To enhance abrasion and/or wear resistance of the hardfacing, it may be desirable to select a hard material, such as WC and/or VC, with greater hardness properties. Table 2 shows comparison between hard materials of WC and VC. For the same weight percentage of carbide, there is no advantage of using WC. In example 4 of WC hardfacing, WC particles of 38.9%, were distributed above SL(50) line, in which WC was required to enhance hardfacing wear resistance. FIG. 11 includes a graph 1100 depicting a plot of weight % of VC (x-axis) versus wear rate (WR, mm³/Krev) (y-axis). Line 1150 shows the wear rate resulting from a change in weight percent VC. Line 1152 shows the wear rate for hard Chrome plating, as shown in Table 1. As indicated in Table 2 and FIG. 11, the selected VC and WC may affect the hardness of the material. Comparing VC to WC, the properties of the selected hard phase material may affect other characteristics.

In deciding which hard material to select, other factors may be taken into consideration. For example, in cases involving components made of corrosive materials, such as Fe alloys, matrix phases with corrosive resistant properties may be used. In another example, density may affect particle distribution through the hardfacing. As shown in Table 2, density of VC is about ⅓ of that of WC. Thus, in cases where the same weight fraction of both carbides is added to the cladding mixture, the volume fraction of VC may be about three times that of WC.

Non-uniform distribution of VC in the hardfacing and higher volume content of carbide at the top half of the hardfacing may create a gradual decrease in thermal expansion coefficient of the hardfacing from the metal component throughout the hardfacing up to its top surface. For example, a calculated thermal expansion of the coefficient may be about $10.3 \times 10^{-6}$ m/m/K above the hardfacing/substrate interface, $10.1 \times 10^{-6}$ m/m/K at the bottom half of the hardfacing, and $9.9 \times 10^{-6}$ m/m/K at the surface portion of the hardfacing.

Cracking may also affect material selection. Reduced carbide content may help prevent cracking A difference in the thermal expansion coefficient between the hardfacing and the component may create thermal residual stress which may result in a greater tendency for the hardfacings to crack during the hardfacing process. Due to its lower density, 5.77 g/cm³, VC may be provided in the hard phase to facilitate distribution about the surface portion of the hardfacing, Per Table 2, the VC has a closer coefficient of thermal expansion to the component or matrix than WC, and may be less likely to exhibit cracking.

Various material combinations may be selected for enhanced interaction. For example, for use with steel materials, the matrix phase may comprise binders, such as a Ni, Fe, or Co, and the hard phase may be a carbide-, nitride-, or boride-containing hard phase. Ni and Fe binders used in the hardfacing may also contain a certain amount of fluxing materials, such as Si, B, or $Si_xMn_y$ alloy. In other example, for hardfacing made of WC, a Ni-alloy matrix or in a steel matrix may be used; and, for hardfacing made of titanium carbide in a steel matrix (sometimes used for drawing or forming tools, guides or rollers), the rounded shape of titanium carbide grains and its lubricity may be used to provide galling and abrasion resistances.

In yet another example, due to dense microstructure, crack resistance, and metallurgical bonding to the tool surface, stainless steel may also be used with a Co-alloy in the matrix phase to increase galling and/or corrosion resistance. The stainless steel surfacing may be used to provide a protection layer over the steel component for corrosion resistance to replace Ni—Cr—Fe—Si—B alloys, such as Colmonoy 5, via laser cladding process. In some cases, stainless steel may have inadequate abrasion resistance. To prevent cracks in the spherical cast WC surfacing, a hardfacing with VC may be used to preserve corrosion resistance of a stainless steel surfacing while increasing improved abrasion resistance.

Various combinations of materials may be selected based on the physical properties, experimental results, and/or other factors (e.g., costs, availability, etc.)

Method of Hardfacing

Figure 12:
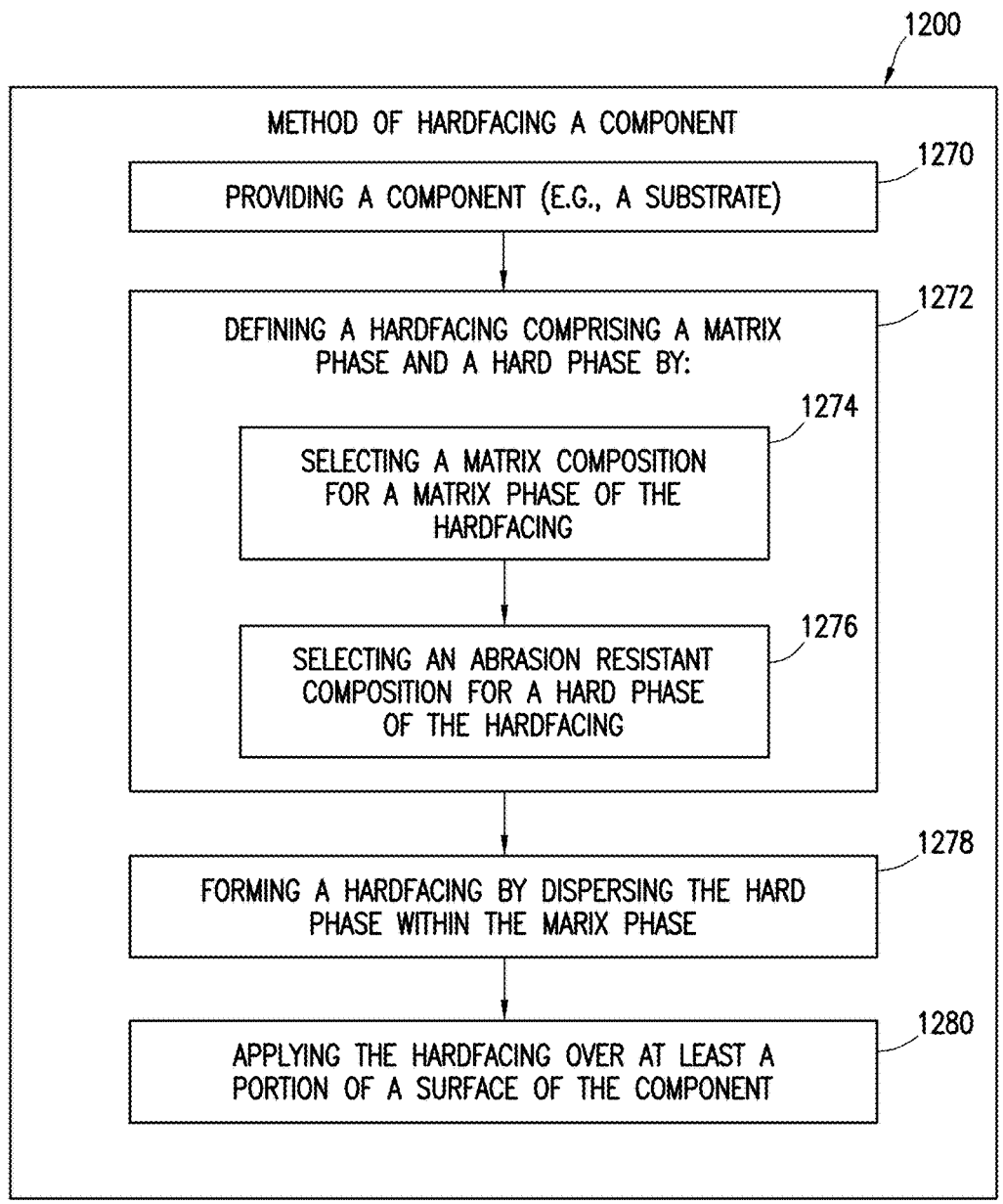
FIG. 12 is a flow chart depicting a method of hardfacing a component.

FIG. 12 shows a method 1200 of hardfacing a component. The method involves 1270—providing a component (e.g., a substrate) and 1272—defining a hardfacing comprising a matrix phase and a hard phase. The defining 1272 may be performed by selecting 1274 a matrix composition for a matrix phase of the hardfacing and 1276 selecting an abrasion resistant composition for a hard phase of the hardfacing.

The selecting 1272 may be performed, for example, by selecting the matrix composition from any of the metal alloys described herein. The matrix composition may comprise a metal alloy and the matrix phase may be continuous. The abrasion resistant composition may comprise a hard material and the hard phase may be discontinuous.

The selecting 1274, 1276 may be performed, for example, based on physical properties, design preferences, specifications and/or other considerations. For example, the hard phase compositions may be selected based on hardness, abrasion resistance (e.g., a tendency of the abrasion-resistant composition to segregate to a surface portion of the hardfacing during hardfacing formation, and/or parameter found to be associated with segregation of the abrasion-resistant composition, such as the particular particle size, the shape of the particles (e.g., spherical, irregular, etc.)), density (e.g., its density relative to the density of the matrix composition), corrosion resistance, etc.)

The providing 1272 may also involve 1278—forming a hardfacing by dispersing the hard phase within the matrix phase. The forming 1278 may be performed, for example, by combining the matrix composition and the abrasion-resistant composition by any suitable means (e.g., physical blending in a mixing apparatus, slurry blending in a suitable liquid phase followed by drying, etc.) The temperature of the mixing may not be particularly important, and may be performed, for example, at a temperature when both the abrasion-resistant hardfacing and the matrix composition are in a solid state.

The method continues by 1280—applying the hardfacing over at least a portion of a surface of the component. The hardfacing may be applied over at least a portion of the surface by any suitable means, such as welding, flame spray, plasma transferred arc (PTA), and/or laser cladding process. The hardfacing may be applied such that a bottom portion is adjacent the surface of the component and a surface portion is on top of the bottom portion (see, e.g., FIG. 4).

The method 1200 may also include further fabrication and/or processing. Part or all of the method may be performed in any order, and repeated as desired.

It will be appreciated by those skilled in the art that the techniques disclosed herein can be implemented for automated/autonomous applications via software configured with algorithms to perform the desired functions. These aspects can be implemented by programming one or more suitable general-purpose computers having appropriate hardware. The programming may be accomplished through the use of one or more program storage devices readable by the processor(s) and encoding one or more programs of instructions executable by the computer for performing the operations described herein. The program storage device may take the form of, e.g., one or more floppy disks; a CD ROM or other optical disk; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Aspects of the disclosure may also be configured to perform the described functions (via appropriate hardware/software) solely on site and/or remotely controlled via an extended communication (e.g., wireless, internet, satellite, etc.) network.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the materials herein with various physical properties may be provided at various quantities and various configurations for use with various types of components.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A hardfacing disposable on a surface of a component, comprising:
    a surface portion and a bottom portion with a segregation line defined therebetween, the surface portion and the bottom portion each comprising:
        a matrix phase comprising a matrix composition comprising a metal alloy; and
        a hard phase distributed in the matrix phase, the hard phase comprising an abrasion-resistant composition comprising a hard material;
    wherein the surface portion has a first concentration of the abrasion-resistant composition and the bottom portion has a second concentration of the abrasion-resistant composition with the first concentration being greater than the second concentration whereby a wear resistant surface is defined on the surface of the component;
    wherein the hard material comprises a plurality of particles having a particle size distribution D(90) of 60 to 200 μm.

2. The hardfacing of claim 1, wherein the segregation line is a line extending from a point half a vertical thickness of the hardfacing at a first location to another point half the vertical thickness of the hardfacing at a second location.

3. The hardfacing of claim 1, wherein the hardfacing comprises about 5 to about 25 wt % of the abrasion-resistant composition.

4. The hardfacing of claim 1, wherein the hardfacing comprises about 75 to about 95 wt % of the matrix composition.

5. The hardfacing of claim 1, wherein the first concentration comprises ≥about 60 wt % of the abrasion-resistant composition and the second concentration comprises ≤about 40 wt % of the abrasion-resistant composition.

6. The hardfacing of claim 1, wherein the abrasion-resistant composition comprises particles having a particle size of about 40 to about 250 μm.

7. The hardfacing of claim 1, wherein the matrix composition comprises at least 50 wt % iron.

8. The hardfacing of claim 1, wherein the matrix composition comprises at least 50 wt % cobalt.

9. The hardfacing of claim 1, wherein the matrix composition comprises stainless steel.

10. The hardfacing of claim 1, wherein the abrasion-resistant composition comprises vanadium carbide.

11. The hardfacing of claim 1, wherein the abrasion-resistant composition comprises titanium carbide.

12. The hardfacing of claim 1, wherein the abrasion-resistant composition comprises titanium boride.

13. The hardfacing of claim 1, wherein the abrasion-resistant composition has a Vickers Hardness ≥about 2000 HV.

14. The hardfacing of claim 1, wherein the abrasion-resistant composition has a density ≤about 15.0 g/cm$^3$.

15. The hardfacing of claim 1, wherein the abrasion-resistant composition has a coefficient of thermal expansion of about $5 \times 10^{-6}$ m/m/K to about $15 \times 10^{-6}$ m/m/K.

16. The hardfacing of claim 1, wherein the component comprises a wellsite component and wherein the surface is steel.

17. A hardfacing disposable on a surface of a wellsite component, the surface comprising a metal alloy, the wellsite component positionable at a wellsite about a wellbore, the hardfacing comprising:
    a matrix phase comprising a matrix composition comprising a metal alloy; and
    a hard phase comprising an abrasion-resistant composition comprising a plurality of vanadium carbide particles distributed about the matrix phase whereby a wear resistant surface is defined on the surface of the wellsite component;
    wherein the plurality of vanadium carbide particles have a particle size distribution D(90) of 60 to 200 μm.

18. The hardfacing of claim 17, wherein the abrasion-resistant composition comprises ≥about 10 wt % vanadium carbide.

19. The hardfacing of claim 17, wherein the matrix composition comprises at least 50 wt % iron.

20. The hardfacing of claim 17, wherein the matrix composition comprises at least 50 wt % cobalt.

21. The hardfacing of claim 17, wherein the matrix composition comprises stainless steel.

22. The hardfacing of claim 17, wherein the hardfacing comprises a bottom portion positionable adjacent the surface of the wellsite component and a surface portion on the bottom portion, the surface portion comprising ≥about 60 wt % of the abrasion-resistant composition and the bottom portion comprising ≤about 40 wt % of the abrasion-resistant composition.

23. The hardfacing of claim 17, wherein the abrasion-resistant composition comprises particles having a particle size of about 40 to about 250 μm.

24. The hardfacing of claim 17, wherein the abrasion-resistant composition has a Vickers Hardness ≥about 2000 HV.

25. The hardfacing of claim 17, wherein the abrasion-resistant composition has a density ≤about 15.0 g/cm$^3$.

26. The hardfacing of claim 17, wherein the abrasion-resistant composition has a coefficient of thermal expansion of about $5 \times 10^{-6}$ m/m/K to about $15 \times 10^{-6}$ m/m/K.

* * * * *